United States Patent
Jung et al.

(10) Patent No.: US 12,410,882 B2
(45) Date of Patent: Sep. 9, 2025

(54) VACUUM ADIABATIC BODY

(71) Applicant: LG ELECTRONICS INC., Seoul (KR)

(72) Inventors: Wonyeong Jung, Seoul (KR); Deokhyun Youn, Seoul (KR); Bongjin Kim, Seoul (KR); Jaehyun Bae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 76 days.

(21) Appl. No.: 18/034,949

(22) PCT Filed: Nov. 1, 2021

(86) PCT No.: PCT/KR2021/015562
§ 371 (c)(1),
(2) Date: May 2, 2023

(87) PCT Pub. No.: WO2022/092962
PCT Pub. Date: May 5, 2022

(65) Prior Publication Data
US 2024/0003480 A1    Jan. 4, 2024

(30) Foreign Application Priority Data

Nov. 2, 2020 (KR) .......... 10-2020-0144774
Nov. 2, 2020 (KR) .......... 10-2020-0144777

(51) Int. Cl.
*F16L 59/065* (2006.01)
*F25D 23/06* (2006.01)

(52) U.S. Cl.
CPC .......... *F16L 59/065* (2013.01); *F25D 23/062* (2013.01); *F25D 2201/14* (2013.01)

(58) Field of Classification Search
None
See application file for complete search history.

(56) References Cited

U.S. PATENT DOCUMENTS 2,768,046 A * 10/1956 Evans .......... F25D 23/062
                                                    220/592.2
11,137,201 B2    10/2021 Jung et al.
(Continued)

FOREIGN PATENT DOCUMENTS

EP    2 289 952 B1    2/2018
JP    2011-033079 A    2/2011
(Continued)

OTHER PUBLICATIONS

International Search Report (with English Translation) and Written Opinion dated Feb. 17, 2022 issued in Application No. PCT/KR2021/015562.
(Continued)

*Primary Examiner* — Maria V Ewald
(74) *Attorney, Agent, or Firm* — KED & ASSOCIATES

(57) ABSTRACT

A vacuum adiabatic body includes a first plate, a second plate, and a seal for sealing the first plate and the second plate to provide a vacuum space. Optionally, the vacuum adiabatic body includes a support for maintaining the vacuum space. Optionally, the vacuum adiabatic body includes a heat transfer resistor for reducing heat transfer between the first plate and the second plate. Optionally, the vacuum adiabatic body includes a component coupler that is connected to at least one of the first and second plates and to which the component is coupled. Optionally, the vacuum adiabatic body includes a side plate extending in a height direction of the vacuum space. Thus, a vacuum adiabatic body for achieving an industrial purpose is provided.

20 Claims, 21 Drawing Sheets

(56) References Cited

U.S. PATENT DOCUMENTS

| | | |
|---|---|---|
| 2018/0216872 A1 | 8/2018 | Jung et al. |
| 2018/0224052 A1 | 8/2018 | Jung et al. |
| 2018/0224193 A1 | 8/2018 | Jung et al. |

FOREIGN PATENT DOCUMENTS

| | | | | |
|---|---|---|---|---|
| JP | 2013-164148 A | 8/2013 | | |
| KR | 10-2017-0016241 A | 2/2017 | | |
| KR | 10-2017-0016245 A | 2/2017 | | |
| WO | WO-2019194604 A1 * | 10/2019 | ............ | F16L 59/065 |

OTHER PUBLICATIONS

Extended European Search Report dated Oct. 9, 2024 issued in Application EP 21 88 6956.

* cited by examiner

[Fig. 1]
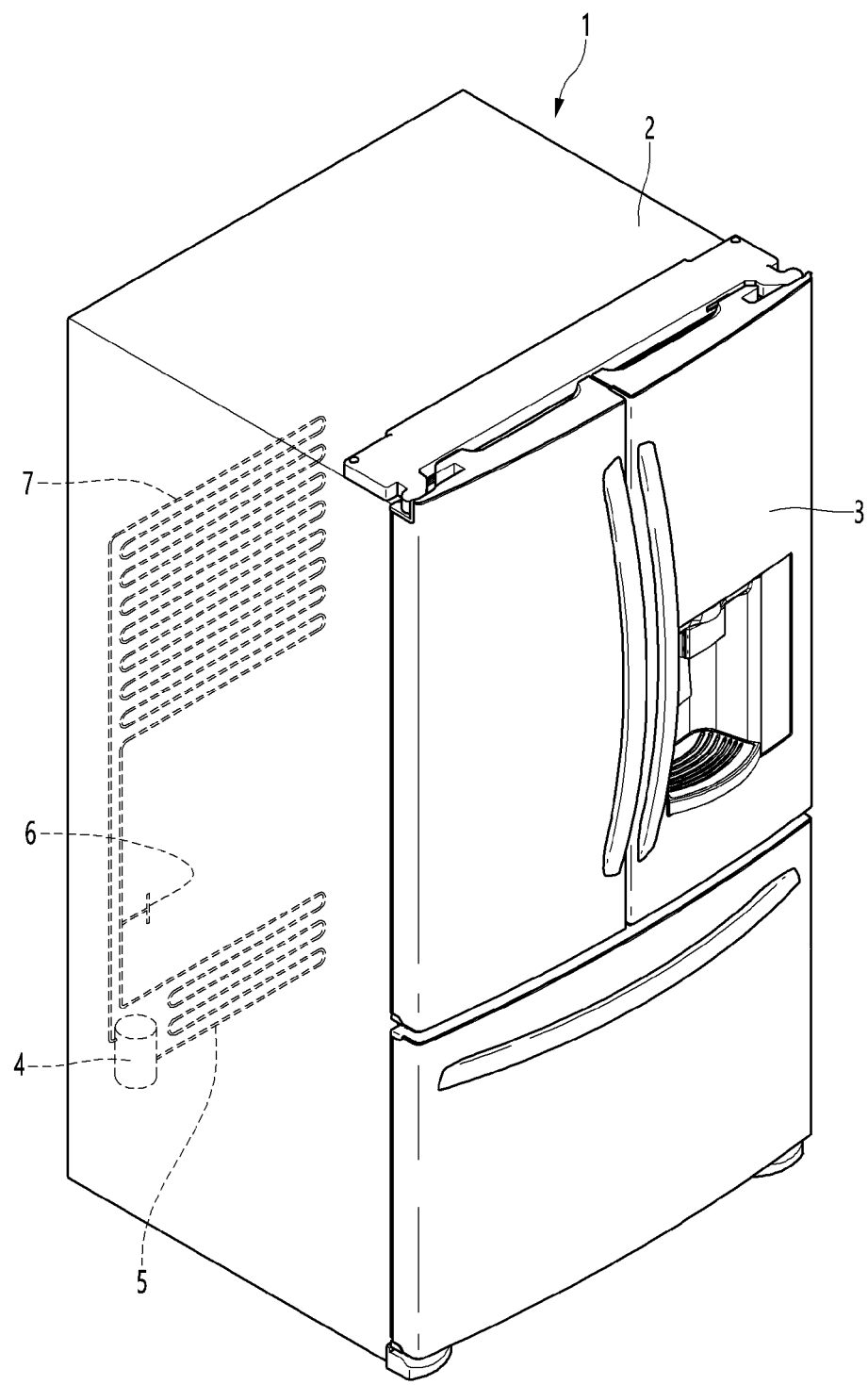

[Fig. 2]
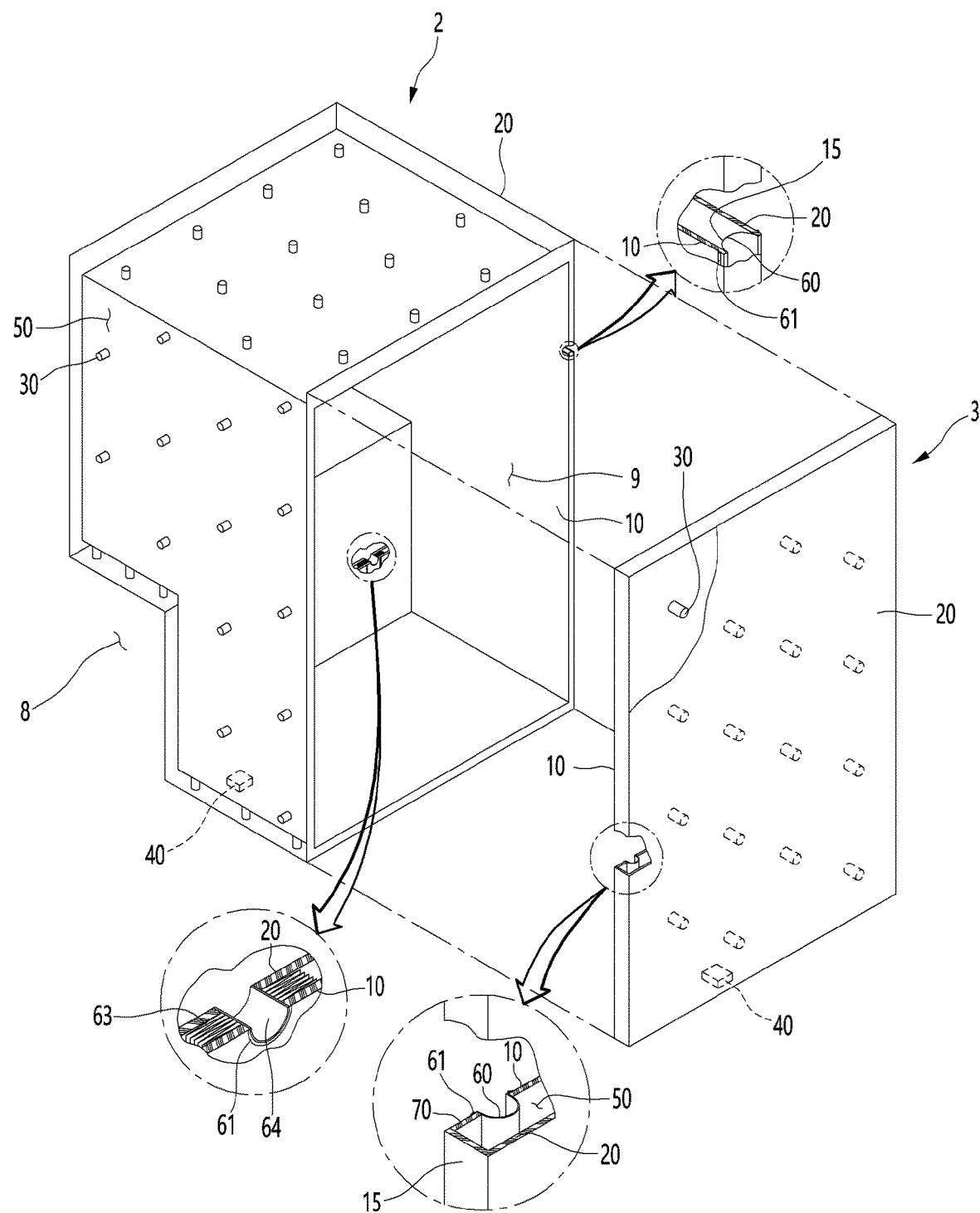

[Fig. 3]
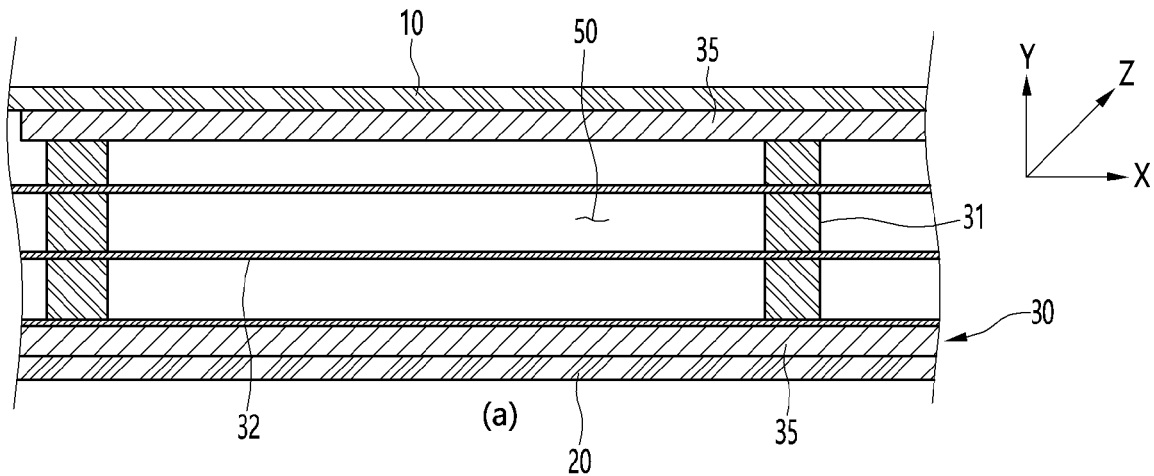
(a)
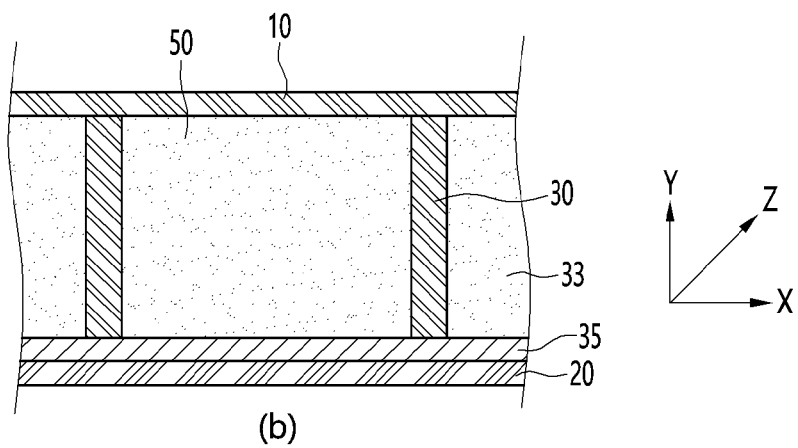
(b)
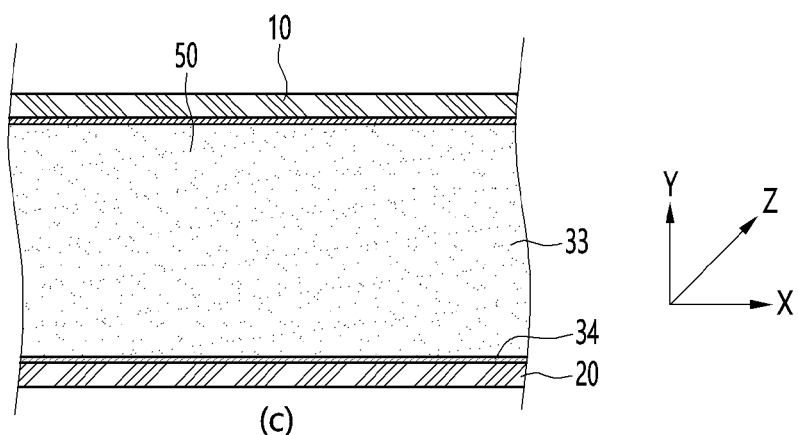
(c)

[Fig. 4]
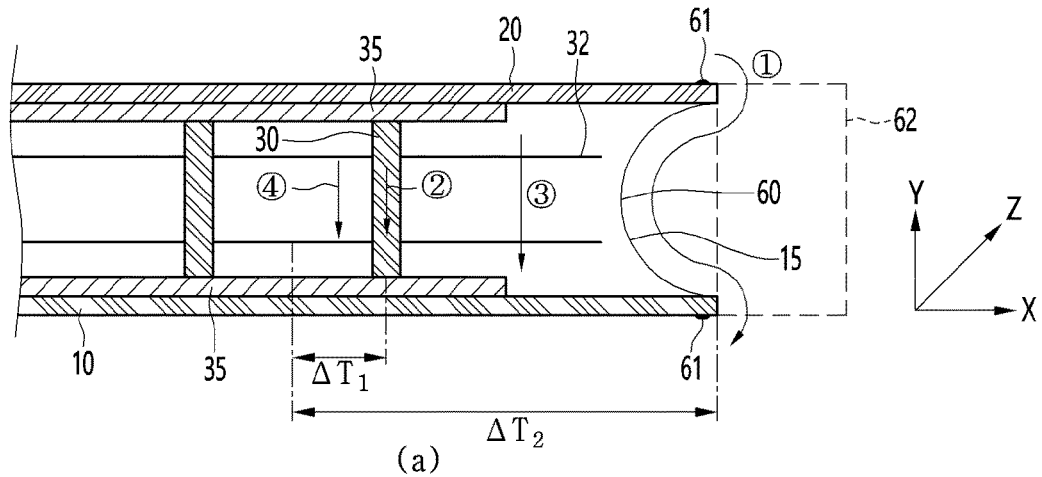
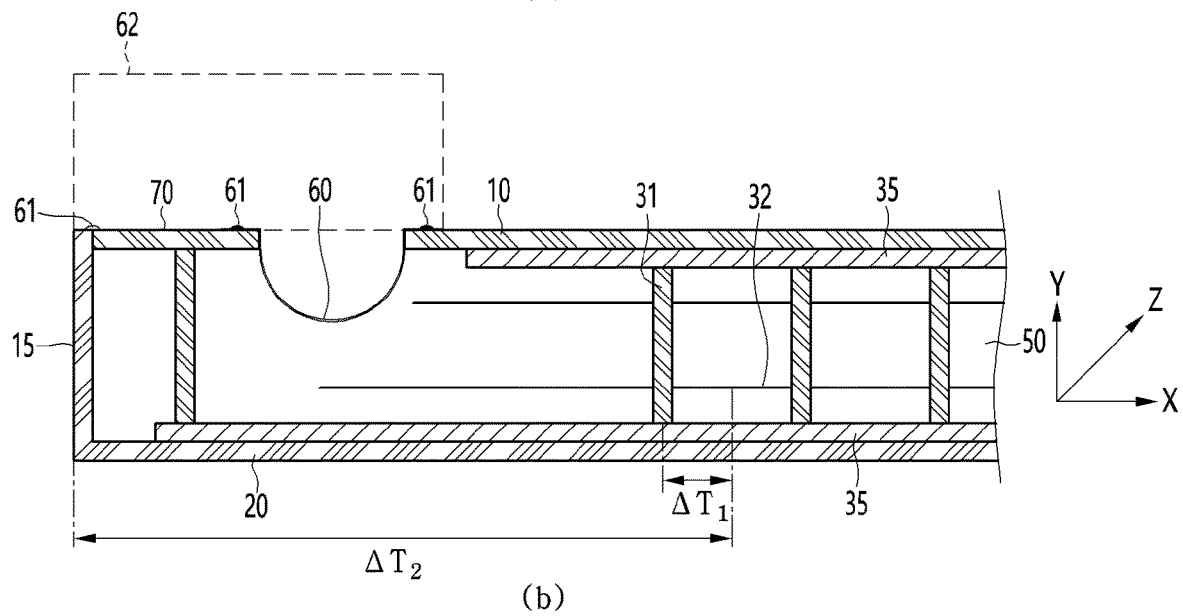
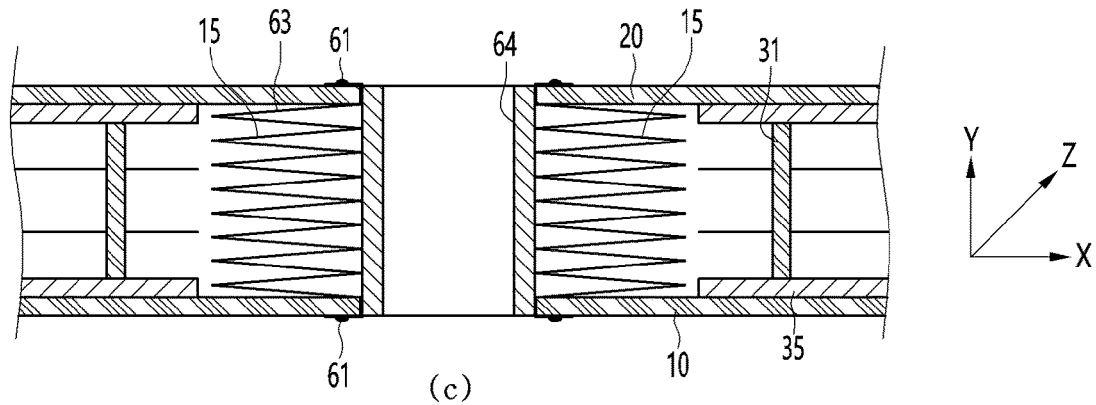

[Fig. 5]
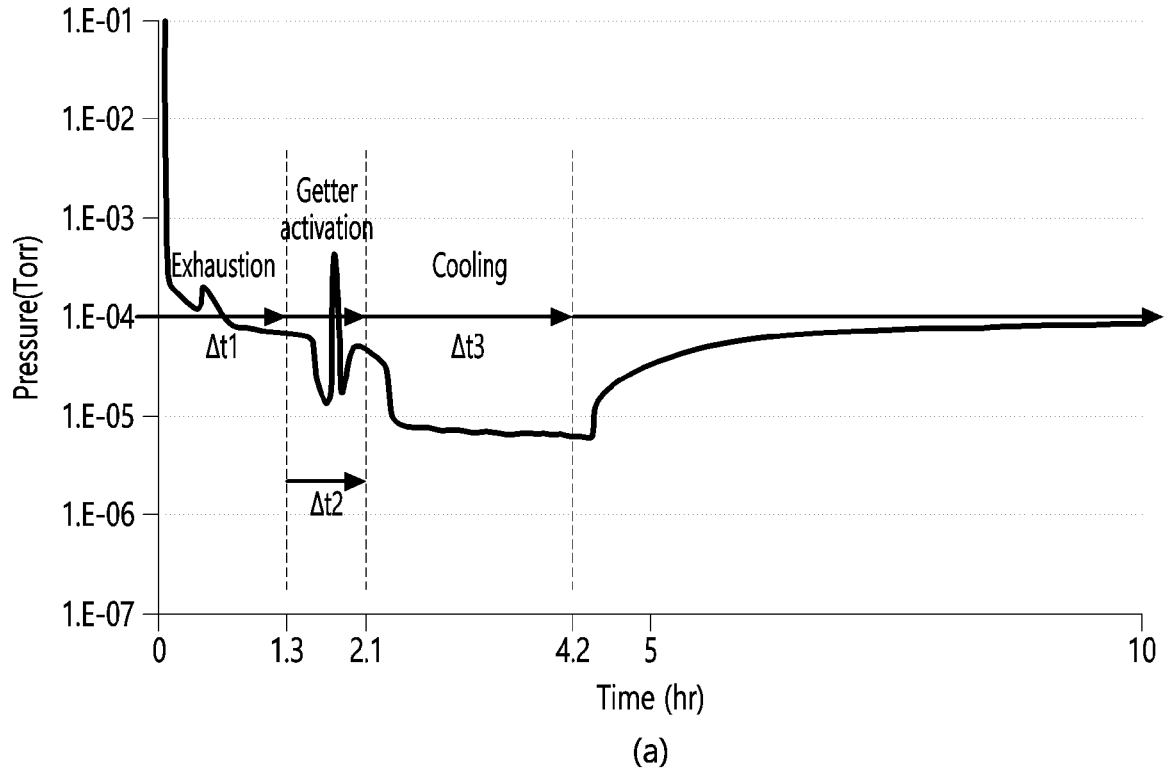
(a)
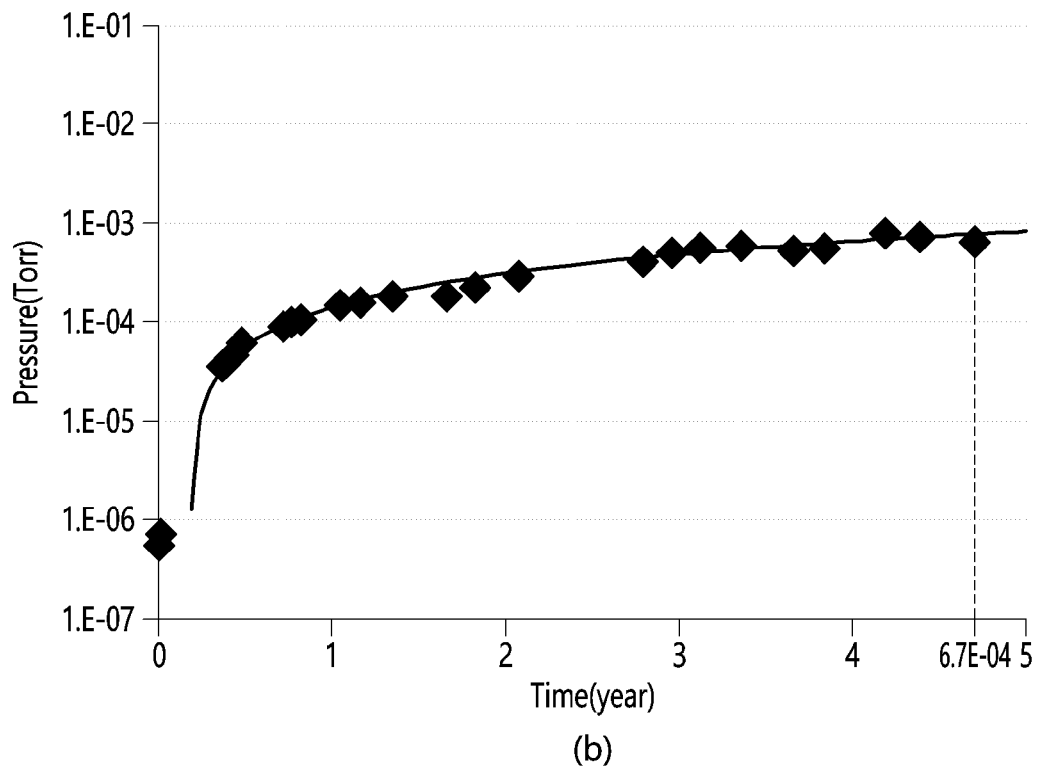
(b)

[Fig. 6]
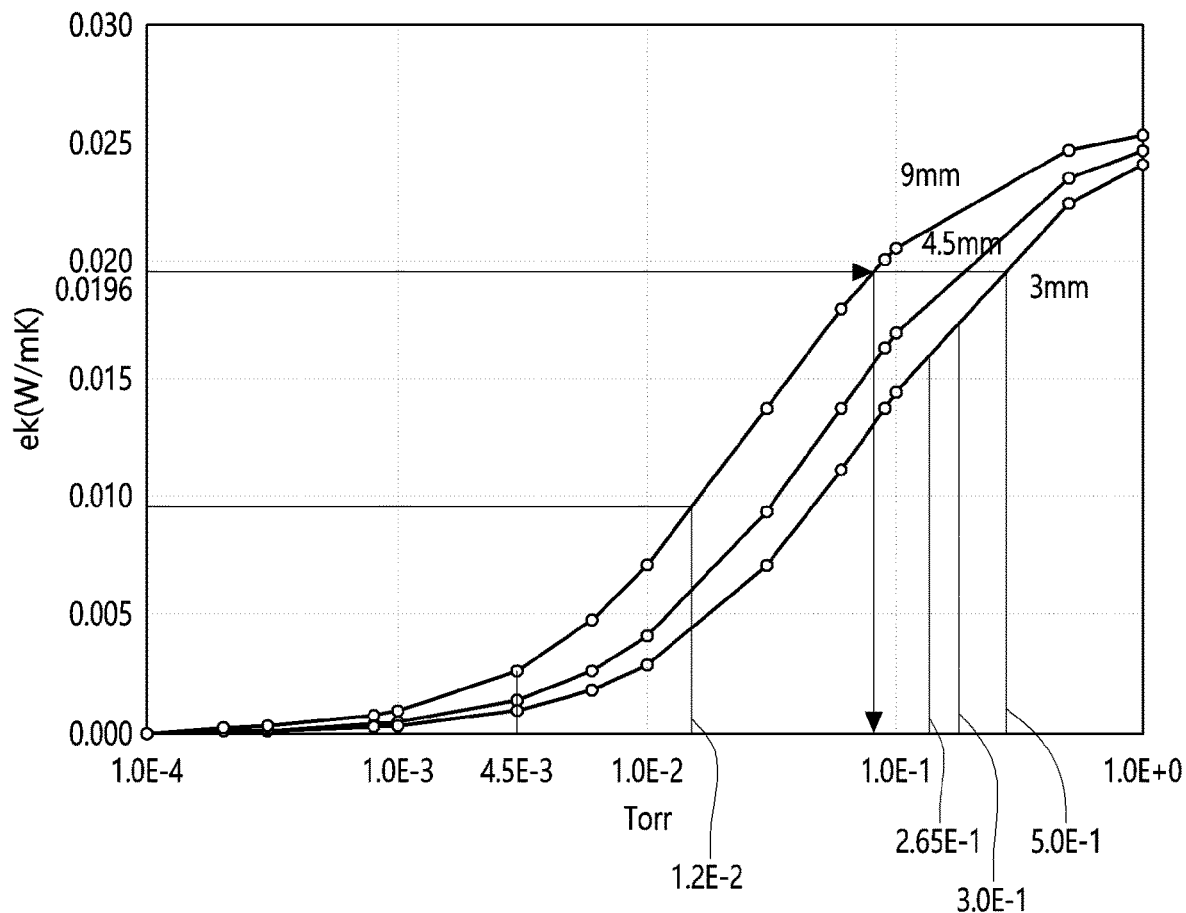

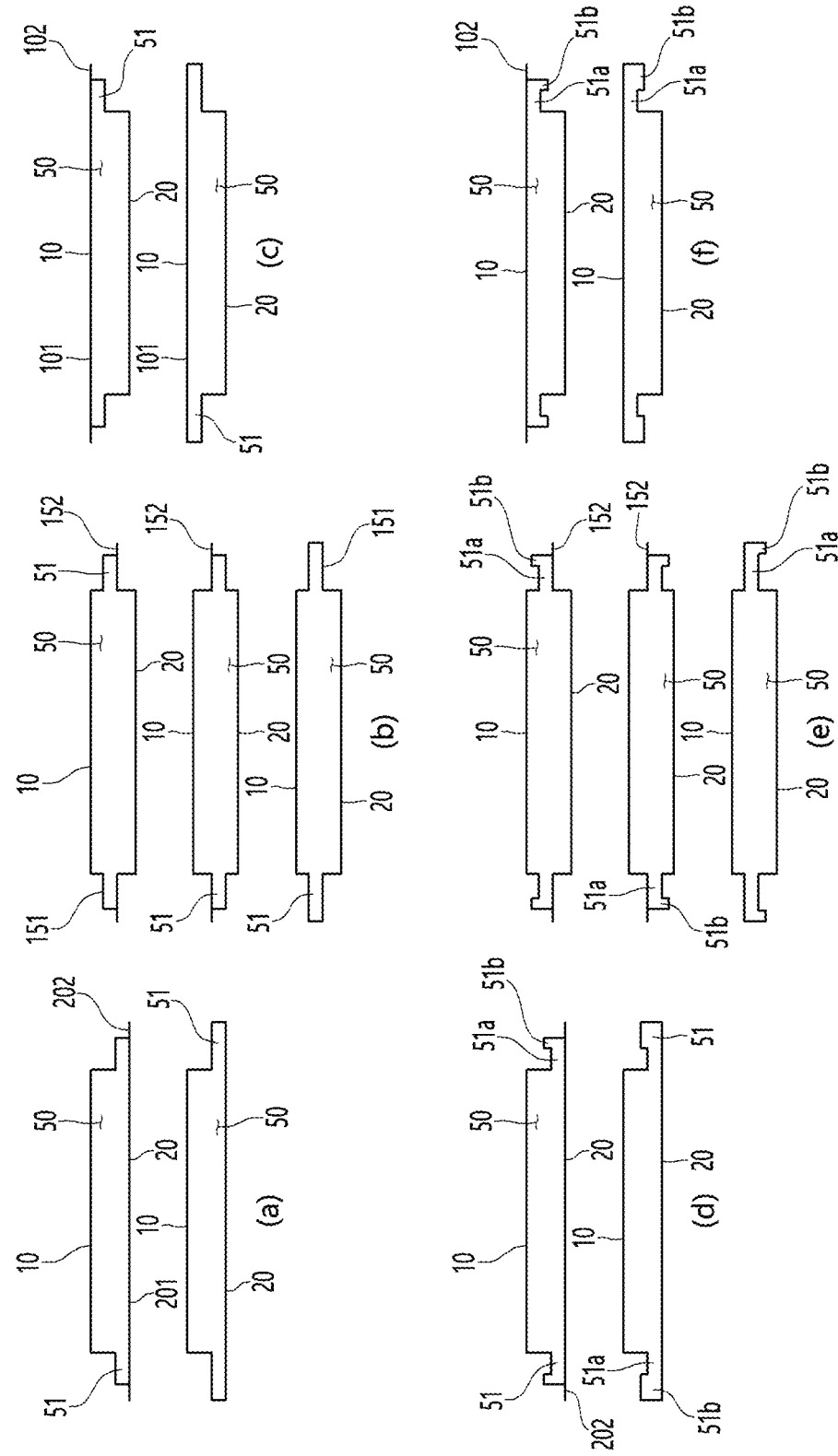
[Figure 7]

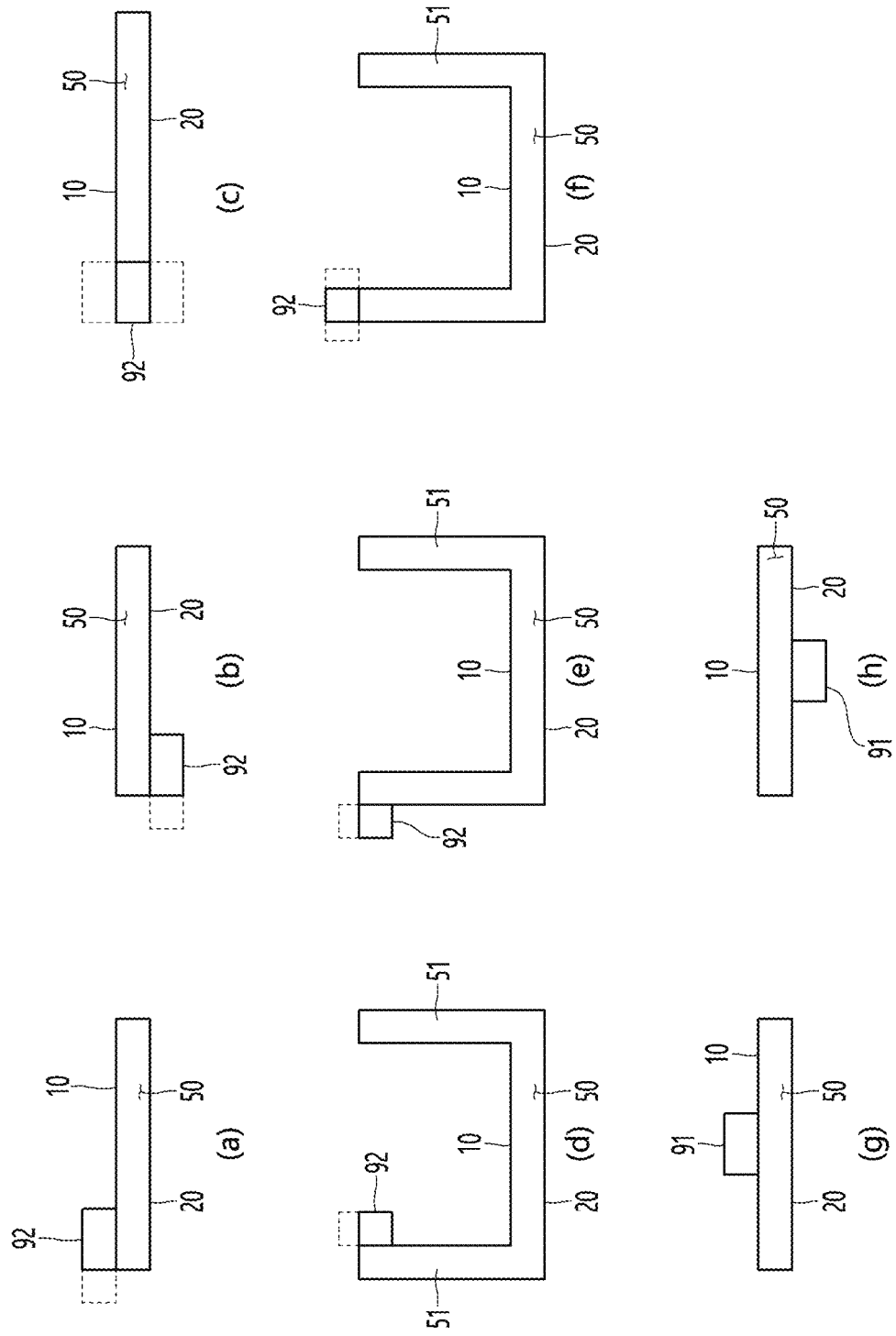
[Figure 8]

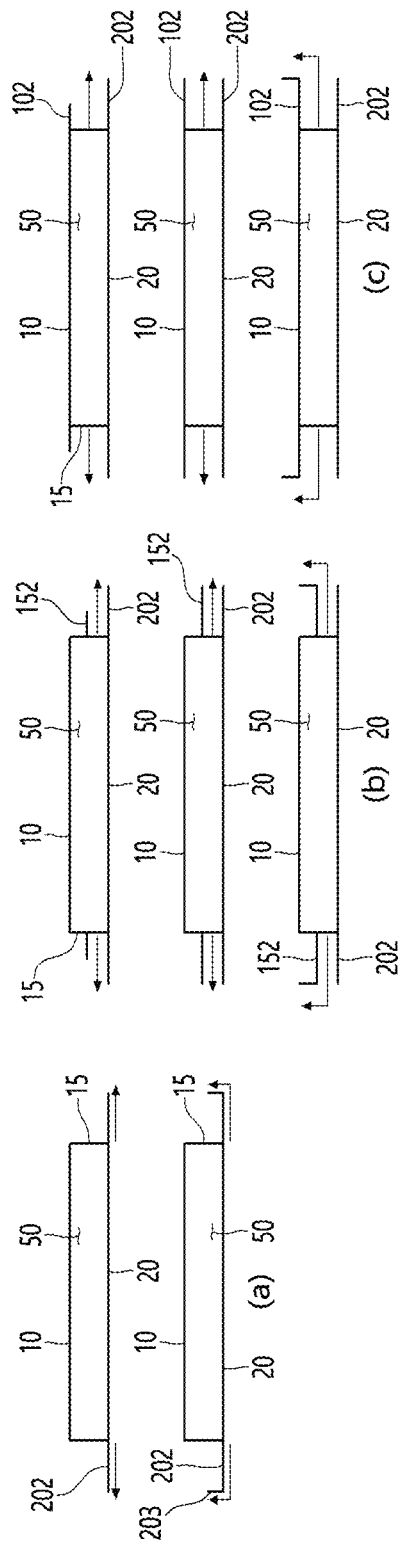
[Figure 9]

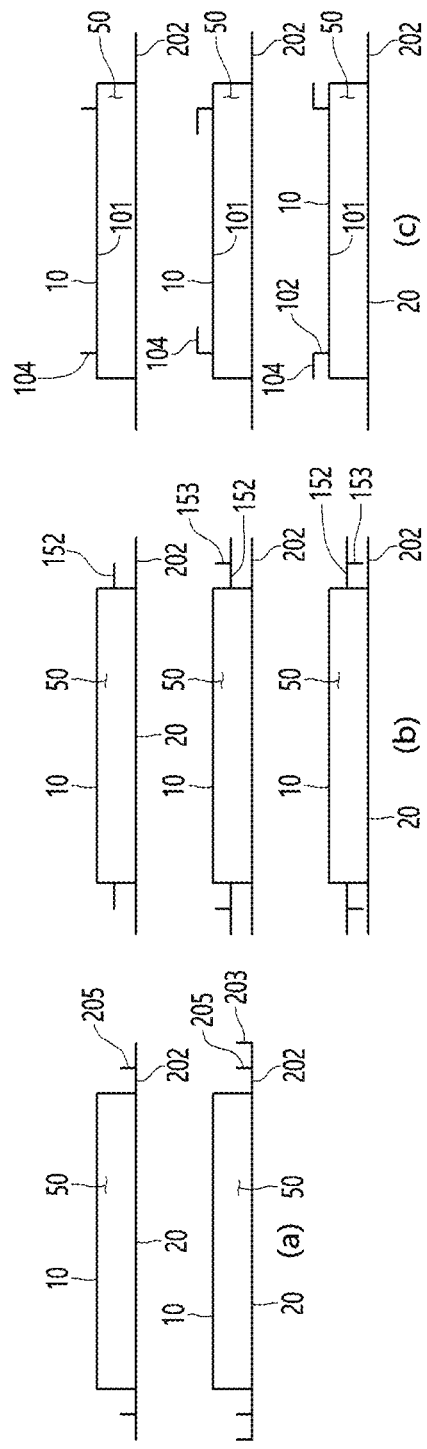
[Figure 10]

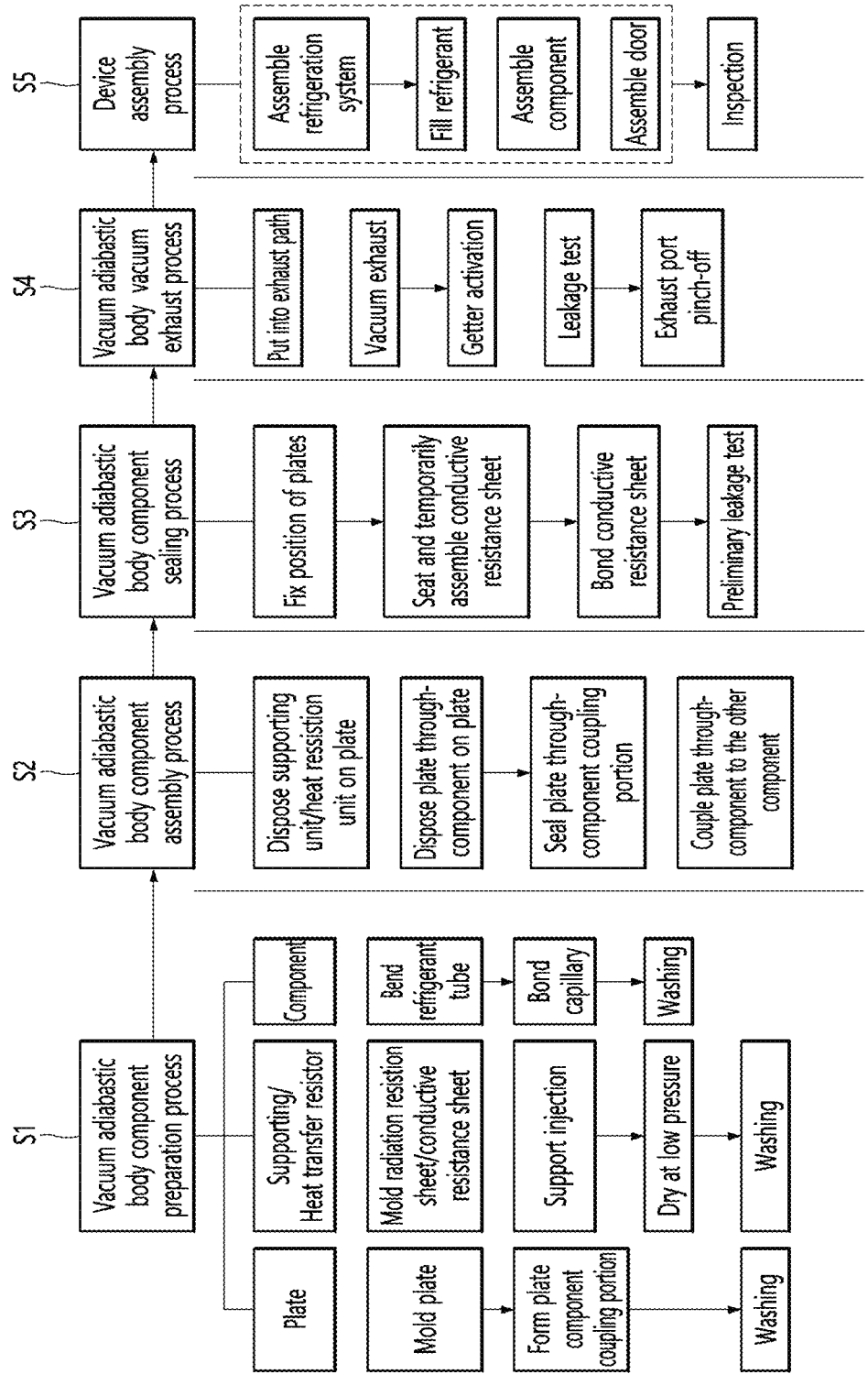
[Figure 11]

[Fig. 12]
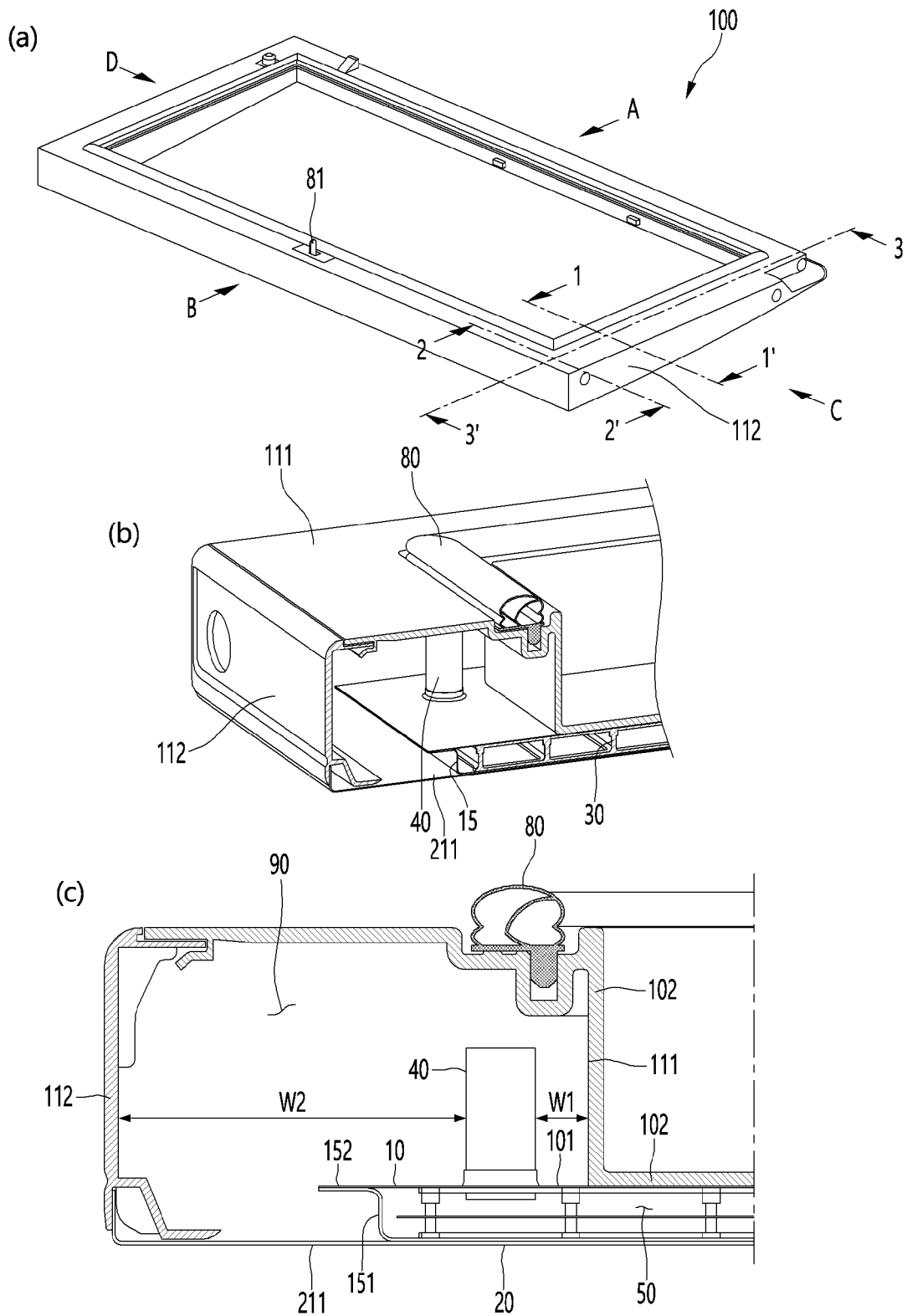

[Fig. 13]
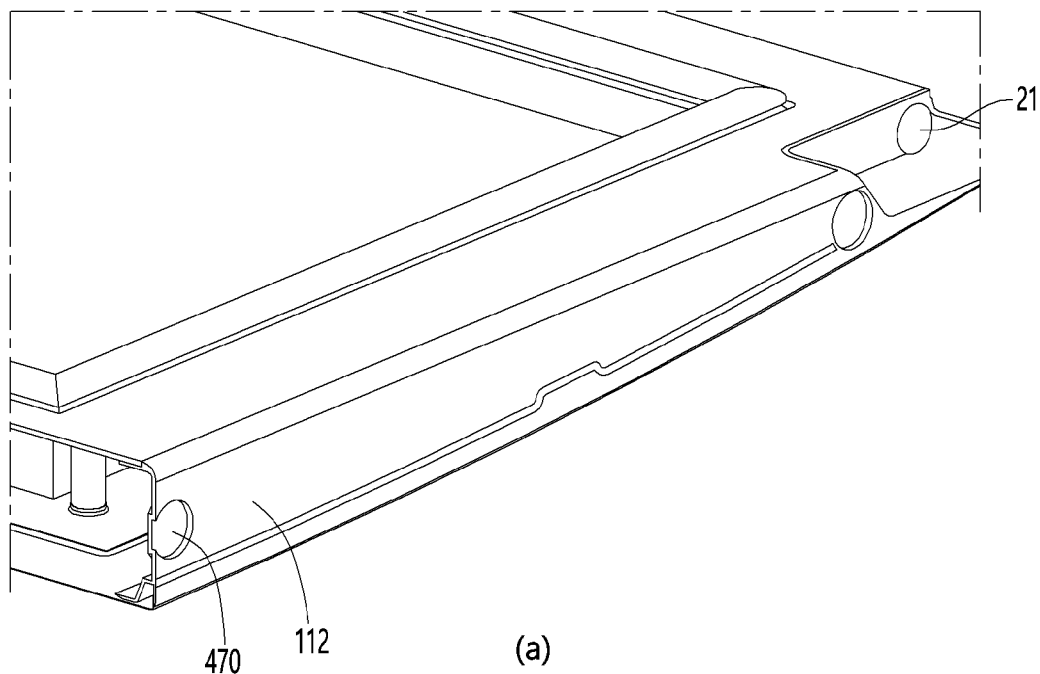
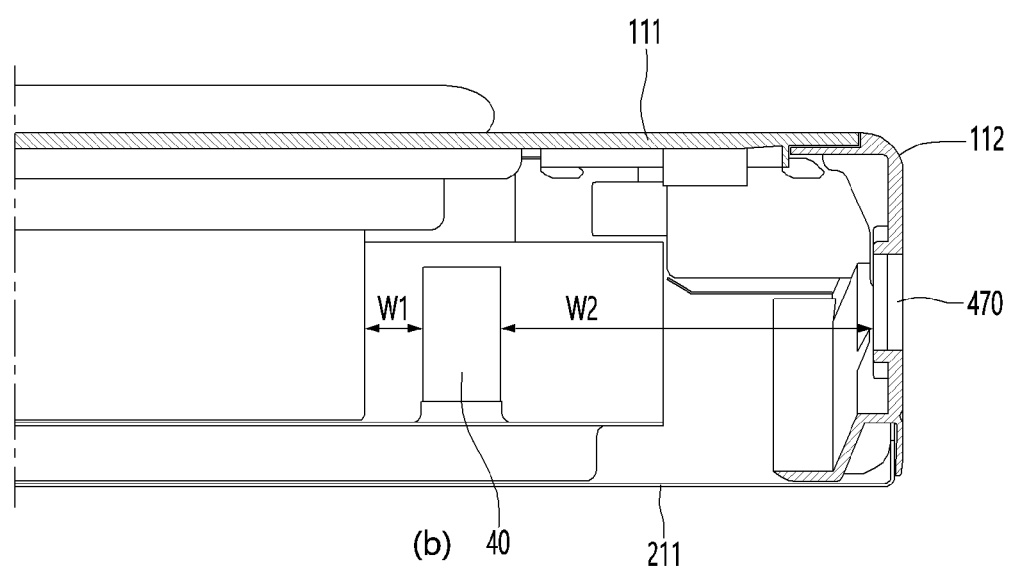

[Fig. 14]
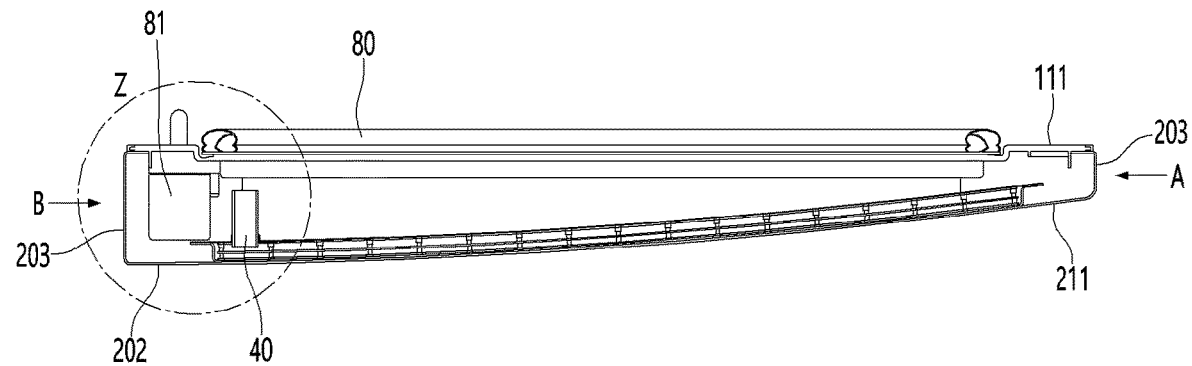
[Fig. 15]
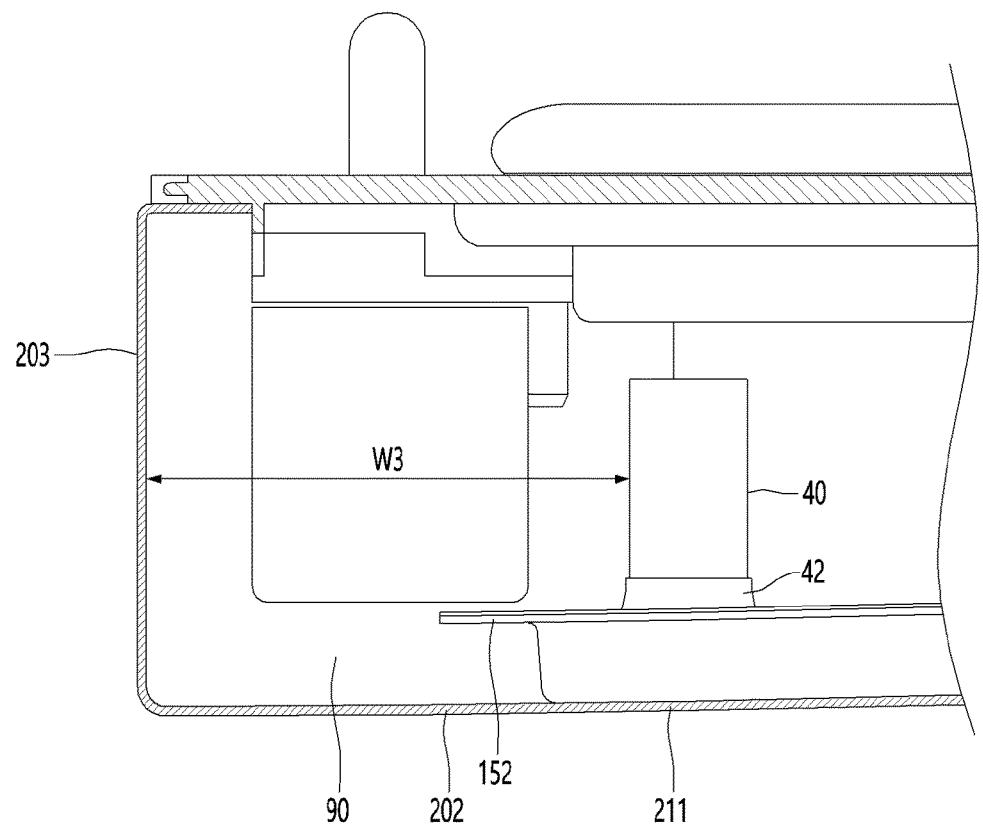

[Fig. 16]
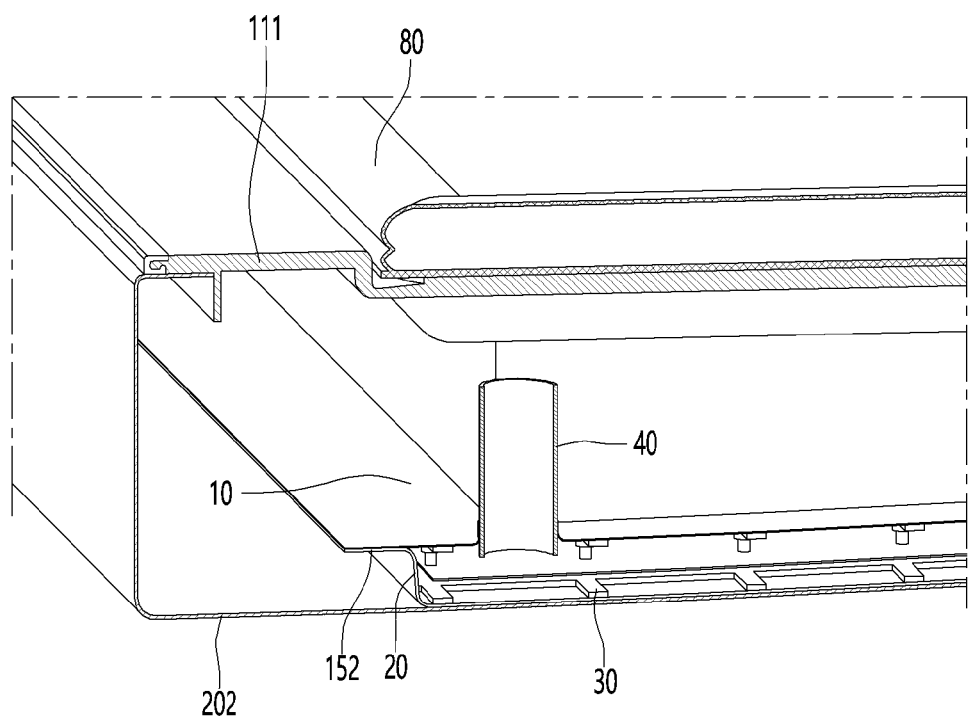

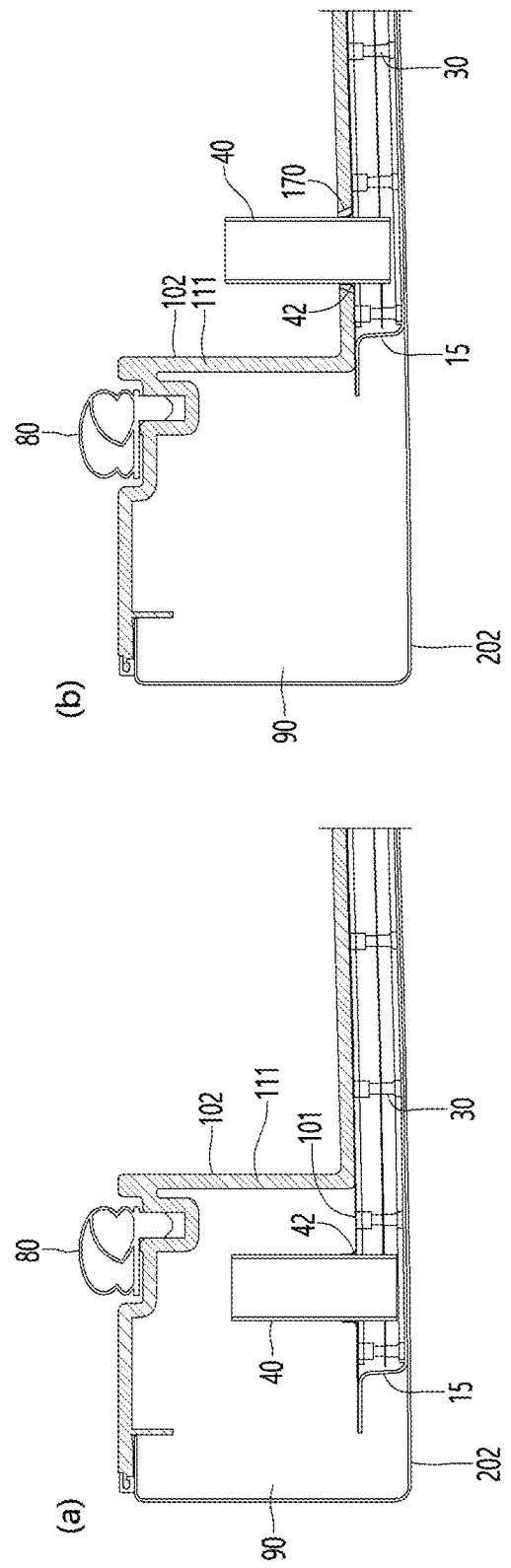

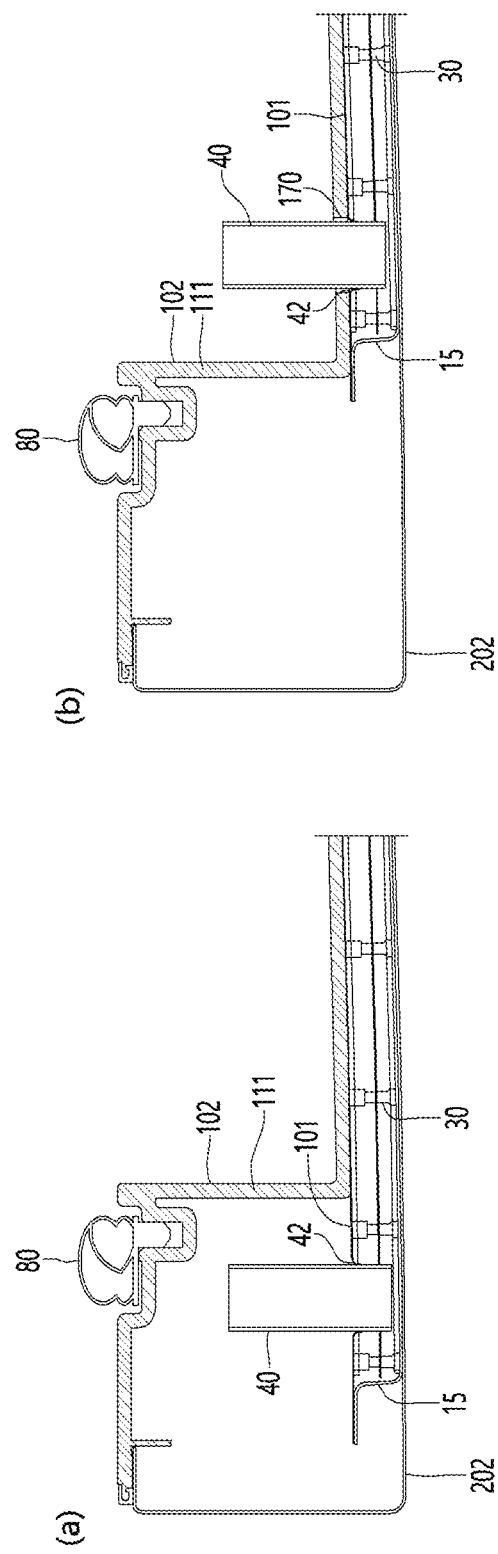
[Figure 18]

[Fig. 19]
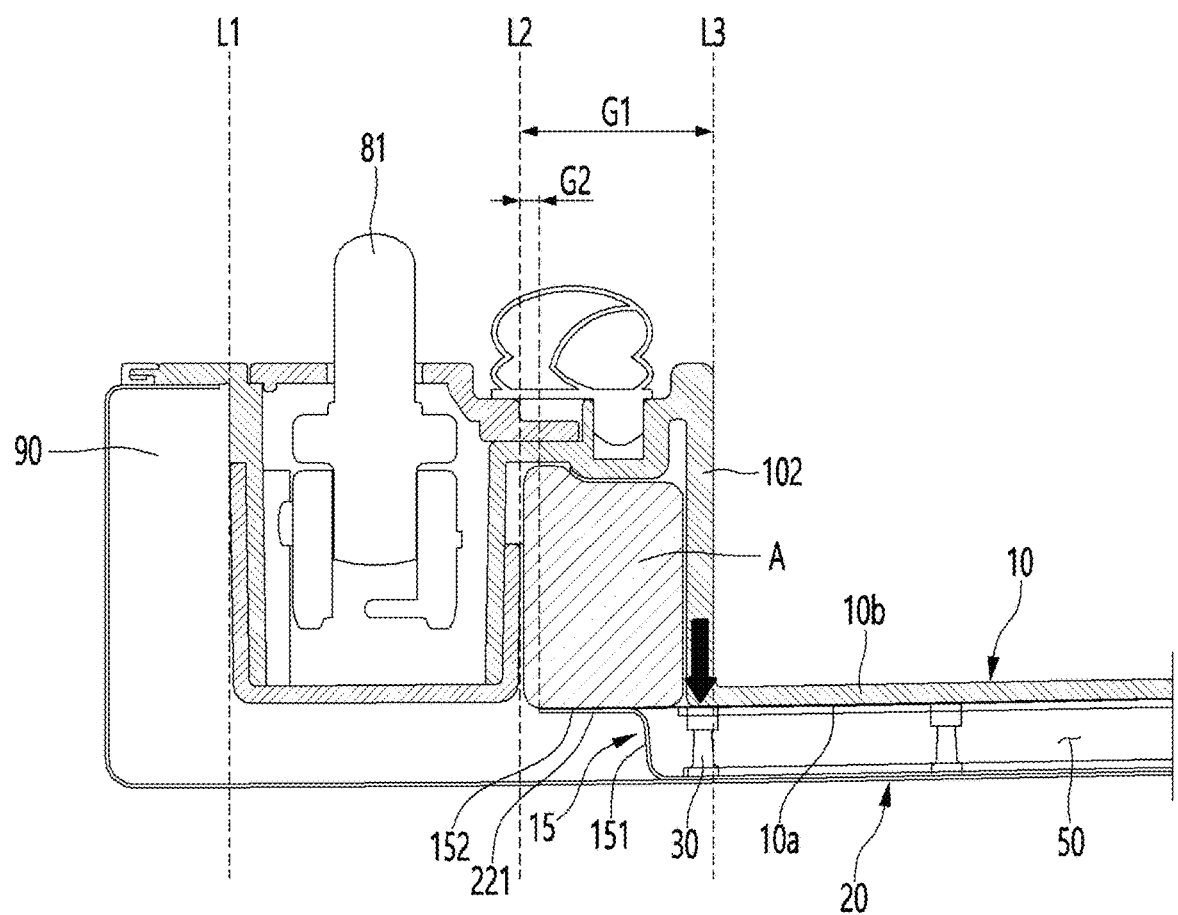

[Figure 20]
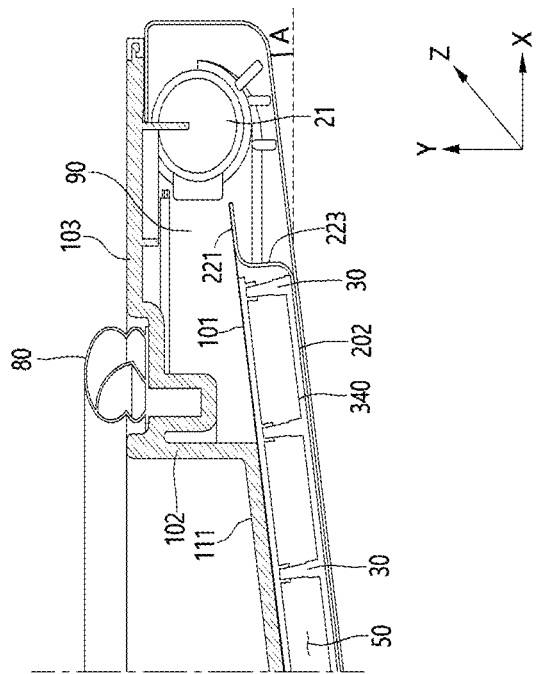
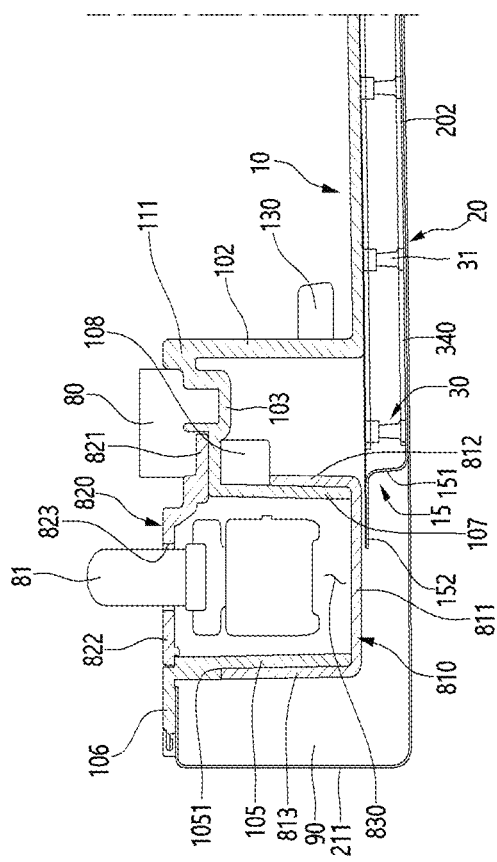

[Fig. 21]
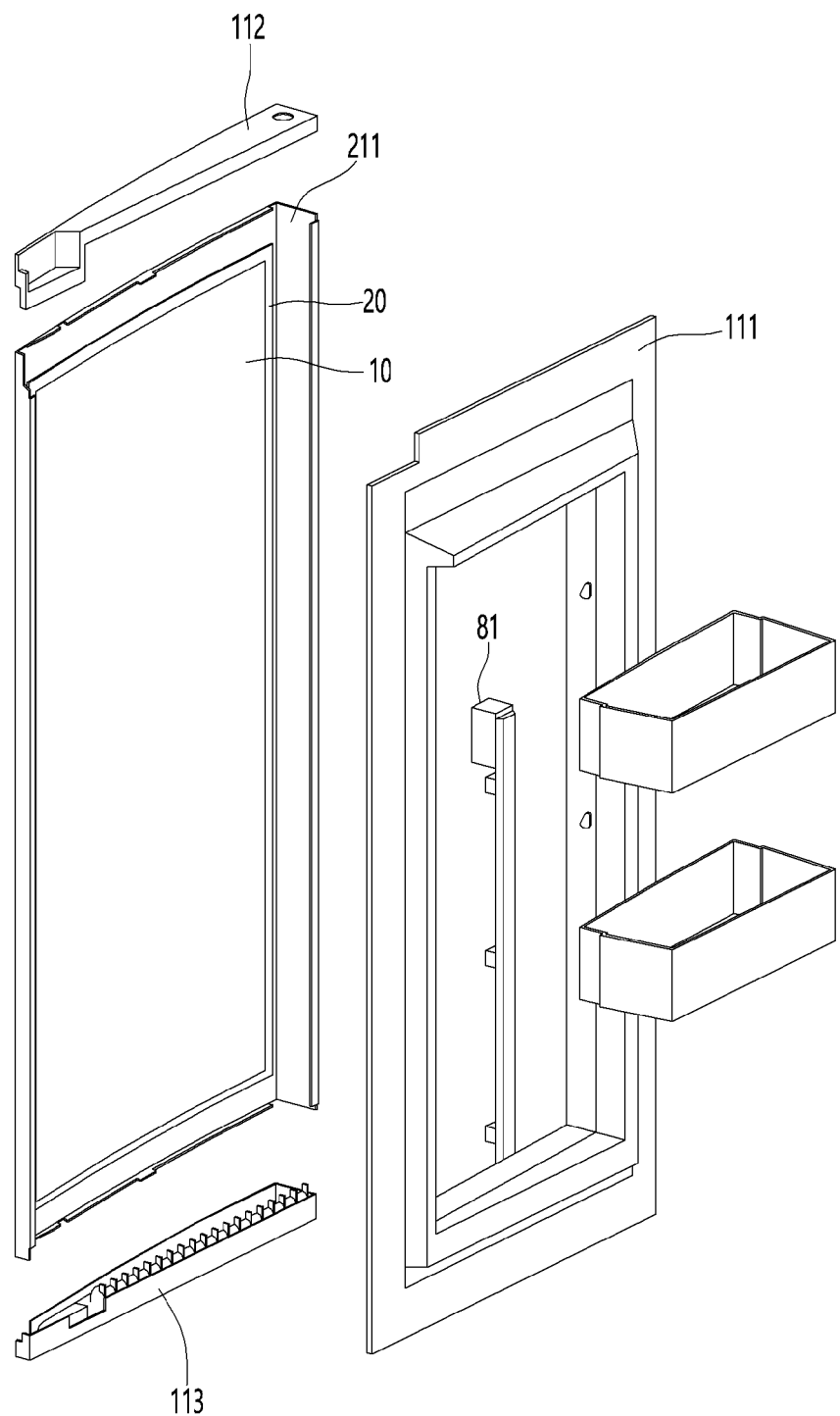

[Fig. 22]
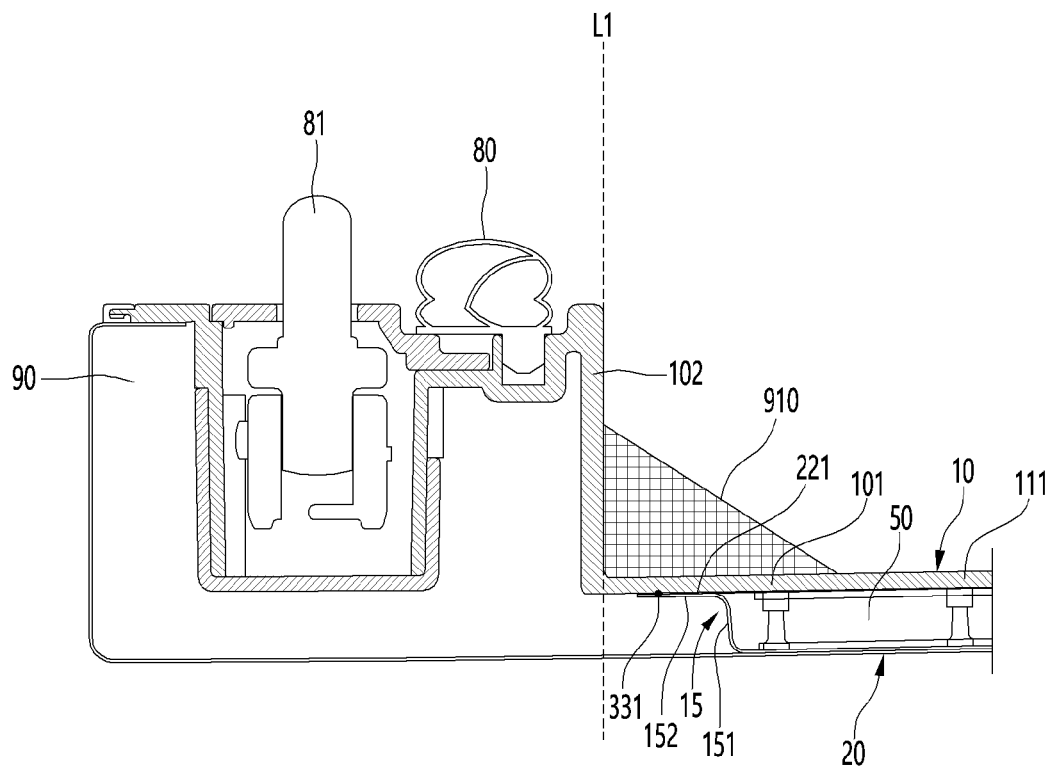
[Fig. 23]
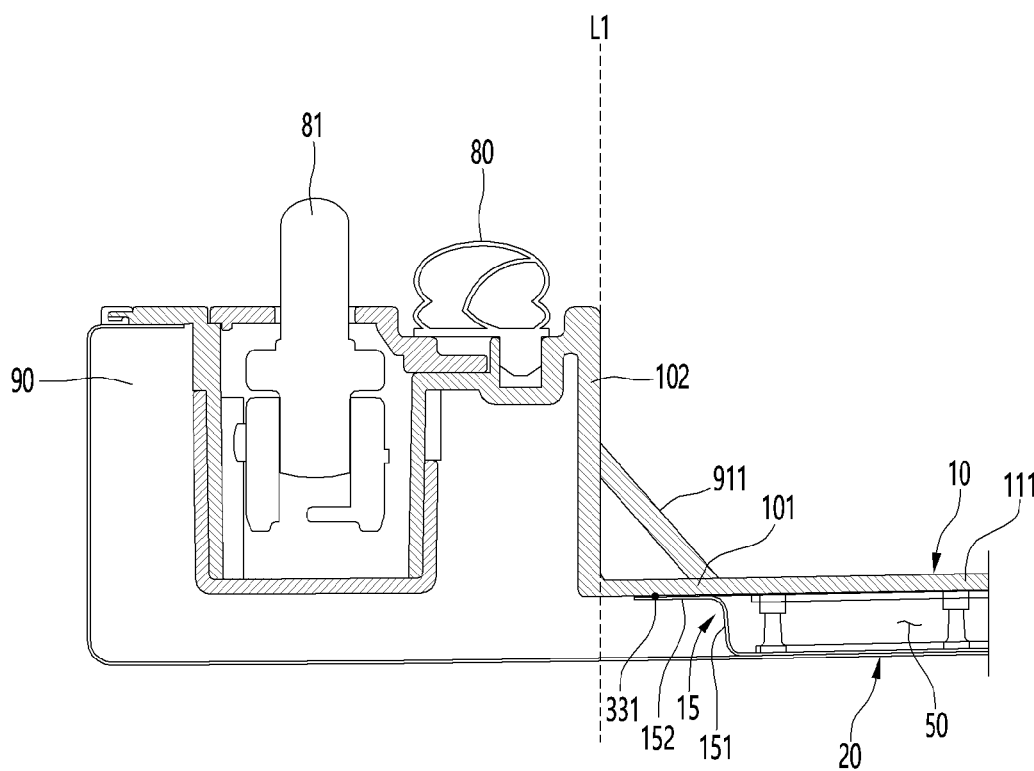

VACUUM ADIABATIC BODY

CROSS-REFERENCE TO RELATED PATENT APPLICATIONS

This application is a U.S. National Stage Application under 35 U.S.C. § 371 of PCT Application No. PCT/KR2021/015562, filed Nov. 1, 2021, which claims priority to Korean Patent Application Nos. 10-2020-0144774 and 10-2020-0144777, both filed Nov. 2, 2020, whose entire disclosures are hereby incorporated by reference.

TECHNICAL FIELD

The present disclosure relates to a vacuum adiabatic body.

BACKGROUND ART

It is possible to improve heat insulation performance by forming a vacuum in an insulating wall. A device having an internal space in which a vacuum is at least partially formed to achieve a thermal insulation effect is called a vacuum adiabatic body.

The applicant develops a technology to obtain a vacuum adiabatic body to be used in various devices and home appliances and discloses a vacuum adiabatic body in Korean Patent Application No. 10-2015-0109724. The vacuum adiabatic body disclosed in the cited reference proposes a periphery insulator positioned on a periphery of the vacuum adiabatic body.

The cited reference does not disclose a component such as a latch for installation on a refrigerator.

DISCLOSURE OF INVENTION

Technical Problem

Therefore, the present disclosure has been made in view of the above problems, and it is an object of the present disclosure to provide an installation structure of a component such as a latch required for an operation of a vacuum adiabatic body.

The present disclosure proposes a vacuum adiabatic body on which a component is reliably installed without reduction in heat insulation performance of a vacuum space.

The present disclosure proposes a vacuum adiabatic body with high impact resistance.

Solution to Problem

A vacuum adiabatic body according to the present disclosure may include a first plate, a second plate, and a seal for sealing the first plate and the second plate to provide a vacuum space. Optionally, the vacuum adiabatic body may include a support for maintaining the vacuum space. Optionally, the vacuum adiabatic body may include a heat transfer resistor for reducing heat transfer between the first plate and the second plate. Optionally, the vacuum adiabatic body may include a component coupler that is connected to at least one of the first and second plates and to which the component is coupled. Optionally, the vacuum adiabatic body may include at least one side plate extending in a height direction of the vacuum space. Thus, a vacuum adiabatic body for achieving an industrial purpose may be provided.

Optionally, the side plate may have a first portion of a side plate, having a large extension component in a height direction of the vacuum space. Optionally, the side plate may have a second portion of the side plate, having a large extension component in a longitudinal direction of the vacuum space. Thus, a region for damping impact may be long.

Optionally, the first plate may have a first portion of the first plate for forming the vacuum space. Optionally, the first plate may include a second portion of the first plate, extending in a direction away from the vacuum space from the first portion of the first plate. Thus, an additional adiabatic body placed in a periphery of the vacuum adiabatic body may be provided. Optionally, a periphery of the vacuum adiabatic body may be insulated using the additional adiabatic body.

Optionally, an edge of the second portion of the side plate may be placed between an imaginary line L2 close to the vacuum space and an imaginary line L3 extending in the height direction of the vacuum space from the second portion of the first plate among two imaginary lines extending in the height direction of the vacuum space from an installation region of the component. Thus, the component and the side plate may be prevented from interfering with each other.

Optionally, the component may include a door latch. Thus, the vacuum adiabatic body may be prevented from being damaged due to impact.

Optionally, the imaginary line L2 close to the vacuum space among two imaginary lines indicating an installation region of the component and an edge of the first straight portion may be spaced apart from each other. Thus, a gap in which at least a foaming solution flows may be ensured.

Optionally, at least a portion of the vacuum space may be placed in a gap between the imaginary line L2 close to the vacuum space and the imaginary line L3 of the second portion of the first plate among two imaginary lines indicating the installation of the component. Thus, an insulation effect may be improved.

Optionally, the component and an edge of the second portion of the side plate may be spaced apart from each other. Thus, a predetermined gap may be ensured to remove a region in which a foaming solution is not filled.

Optionally, the support may include a plurality of bars spaced apart from each other. Thus, a vacuum space may be maintained.

Optionally, at least one of the plurality of bars may be disposed in parallel to or adjacent to the imaginary line L3 of the second portion of the first plate. Thus, the impact resistance of the support may be improved.

Optionally, a bar disposed in parallel to the imaginary line L3 of the second portion of the first plate may be a bar placed at the outermost side in a longitudinal direction of the vacuum space. Thus, the support may be prevented from being damaged due to external shock.

Optionally, a sufficient interval in which a foaming solution flows through a gap between the component and an edge of the second portion of the side plate may be ensured. Thus, no more pressure is required for penetration of the foaming solution, and productivity may be improved.

Optionally, the second portion of the side plate may be placed at a central side of the vacuum space on an imaginary line L1 extending in a height direction of the vacuum space from the second portion of the first plate. Thus, the vacuum adiabatic body may be prevented from being damaged due to at least one of foaming pressure or impact.

Optionally, the second portion of the side plate may be aligned with the inside space in the height direction of the vacuum space.

Optionally, the second portion of the side plate may be placed adjacent to the vacuum space at a portion from which the first portion of the first plate and the second portion of the second plate are branched.

the third portion 203 of the second plate may be placed at an edge of at least one of the first side or the second side.

the flange may be prevented from interfering with at least one of the support 30 or the heat transfer resistor. At least one of the support 30 and the heat transfer resistor may be installed using various methods. At least one of the support 30 or the heat transfer resistor may be installed in plural.

A foaming solution may not be filled to cause at least one of severe insulation loss or a reduction in strength of the vacuum adiabatic body.

Advantageous Effects of Invention

According to the present disclosure, strength to withstand the inevitably generated impact due to use of a vacuum adiabatic body may be increased.

According to the present disclosure, a component such as a latch may be installed on an additional adiabatic body, thereby preventing reduction in heat insulation performance in the component.

According to the present disclosure, the amount of impact generated by a latch or the like may be smoothly absorbed.

The present disclosure may provide an industrially applicable vacuum adiabatic body by improving the productivity of the vacuum adiabatic body.

According to the present disclosure, a region in which a foaming member configuring an additional adiabatic body is not filled by allowing a foaming solution to smoothly flow may be removed, thereby improving an insulation effect.

According to the present disclosure, damage to a seal may be prevented, and reduction in insulation performance may be prevented.

BRIEF DESCRIPTION OF DRAWINGS

FIG. 1 is a perspective view of a refrigerator according to an embodiment.

FIG. 2 is a schematic view illustrating a vacuum adiabatic body used for a body and a door of the refrigerator.

FIG. 3 is a view illustrating an example of a support that maintains the vacuum space.

FIG. 4 is a view for explaining an example of a vacuum adiabatic body based on a heat transfer resistor.

FIG. 5 is a graph for observing a process of exhausting the inside of the vacuum adiabatic body with a time and pressure when the support is used.

FIG. 6 is a graph illustrating results obtained by comparing the vacuum pressure with gas conductivity.

FIG. 7 is a view illustrating various examples of the vacuum space.

FIG. 8 is a view for explaining another adiabatic body.

FIG. 9 is a view for explaining a heat transfer path between first and second plates having different temperatures.

FIG. 10 is a view for explaining a branch portion on the heat transfer path between first and second plates having different temperatures.

FIG. 11 is a view for explaining a process of manufacturing the vacuum adiabatic body.

FIG. 12 is a set of a perspective view and a partial cross-sectional view of a vacuum adiabatic body, FIG. 12*a* is a diagram showing a vacuum adiabatic body with a left side being a bottom and a right side being a top, FIG. 12*b* is a sectional perspective view taken along 1-1' of FIG. 12*a*, and FIG. 12*c* is a cross-sectional view taken along 1-1'. In the drawings, a foam member is removed.

FIG. 13 is a set of a sectional perspective view and a cross-sectional view for explaining a section taken along 2-2' of FIG. 12*a*, FIG. 13*a* is a sectional perspective view, and FIG. 13*b* is a cross-sectional view.

FIGS. 14 to 16 are drawings related to a section taken along 3-3' of FIG. 12*a*, FIG. 14 is a cross-sectional view taken along 3-3' of FIG. 12*a*, FIG. 15 is an enlarged view of a section of a portion Z of FIG. 14, and FIG. 16 is a sectional perspective view.

FIGS. 17 and 18 are diagrams showing a flange according to embodiments and propose the cases with different extension directions of flanges and different positions of the flanges according to embodiments.

FIG. 19 is a cross-sectional view of a periphery of a vacuum adiabatic body according to an embodiment.

FIG. 20 is a diagram showing comparison between a cross-sectional view at the second side of the vacuum adiabatic body and a cross-sectional view at the first side of the vacuum adiabatic body.

FIG. 21 is an exploded perspective view of a vacuum adiabatic body.

FIG. 22 is a cross-sectional view of a periphery of a vacuum adiabatic body according to another embodiment.

FIG. 23 is a modified example of an embodiment of FIG. 22.

BEST MODE FOR CARRYING OUT THE INVENTION

Hereinafter, specific embodiments will be described in detail with reference to the accompanying drawings. The invention may, however, be embodied in many different forms and should not be construed as being limited to the embodiments set forth herein, and a person of ordinary skill in the art, who understands the spirit of the present invention, may readily implement other embodiments included within the scope of the same concept by adding, changing, deleting, and adding components; rather, it will be understood that they are also included within the scope of the present invention. The present invention may have many embodiments in which the idea is implemented, and in each embodiment, any portion may be replaced with a corresponding portion or a portion having a related action according to another embodiment. The present invention may be any one of the examples presented below or a combination of two or more examples.

The present disclosure relates to a vacuum adiabatic body including a first plate; a second plate; a vacuum space defined between the first and second plates; and a seal providing the vacuum space that is in a vacuum state. The vacuum space may be a space in a vacuum state provided in an internal space between the first plate and the second plate. The seal may seal the first plate and the second plate to provide the internal space provided in the vacuum state. The vacuum adiabatic body may optionally include a side plate connecting the first plate to the second plate. In the present disclosure, the expression "plate" may mean at least one of the first and second plates or the side plate. At least a portion of the first and second plates and the side plate may be integrally provided, or at least portions may be sealed to each other. Optionally, the vacuum adiabatic body may include a support that maintains the vacuum space. The vacuum adiabatic body may selectively include a thermal insulator that reduces an amount of heat transfer between a first space provided in vicinity of the first plate and a second space provided in vicinity of the second plate or reduces an amount of heat transfer between the first plate and the second plate. Optionally, the vacuum adiabatic body may include a component coupling portion provided on at least a portion of the plate. Optionally, the vacuum adiabatic body may include another adiabatic body. Another adiabatic body may be provided to be connected to the vacuum adiabatic body. Another adiabatic body may be an adiabatic body having a degree of vacuum, which is equal to or different from a degree of vacuum of the vacuum adiabatic body. Another adiabatic body may be an adiabatic body that does not include a degree of vacuum less than that of the vacuum adiabatic body or a portion that is in a vacuum state therein. In this case, it may be advantageous to connect another object to another adiabatic body.

In the present disclosure, a direction along a wall defining the vacuum space may include a longitudinal direction of the vacuum space and a height direction of the vacuum space. The height direction of the vacuum space may be defined as any one direction among virtual lines connecting the first space to the second space to be described later while passing through the vacuum space. The longitudinal direction of the vacuum space may be defined as a direction perpendicular to the set height direction of the vacuum space. In the present disclosure, that an object A is connected to an object B means that at least a portion of the object A and at least a portion of the object B are directly connected to each other, or that at least a portion of the object A and at least a portion of the object B are connected to each other through an intermedium interposed between the objects A and B. The intermedium may be provided on at least one of the object A or the object B. The connection may include that the object A is connected to the intermedium, and the intermedium is connected to the object B. A portion of the intermedium may include a portion connected to either one of the object A and the object B. The other portion of the intermedium may include a portion connected to the other of the object A and the object B. As a modified example, the connection of the object A to the object B may include that the object A and the object B are integrally prepared in a shape connected in the above-described manner. In the present disclosure, an embodiment of the connection may be support, combine, or a seal, which will be described later. In the present disclosure, that the object A is supported by the object B means that the object A is restricted in movement by the object B in one or more of the +X, −X, +Y, −Y, +Z, and −Z axis directions. In the present invention, an embodiment of the support may be the combine or seal, which will be described later. In the present invention, that the object A is combined with the object B may define that the object A is restricted in movement by the object B in one or more of the X, Y, and Z-axis directions. In the present disclosure, an embodiment of the combining may be the sealing to be described later. In the present disclosure, that the object A is sealed to the object B may define a state in which movement of a fluid is not allowed at the portion at which the object A and the object B are connected. In the present disclosure, one or more objects, i.e., at least a portion of the object A and the object B, may be defined as including a portion of the object A, the whole of the object A, a portion of the object B, the whole of the object B, a portion of the object A and a portion of the object B, a portion of the object A and the whole of the object B, the whole of the object A and a portion of the object B, and the whole of the object A and the whole of the object B. In the present disclosure, that the plate A may be a wall defining the space A may be defined as that at least a portion of the plate A may be a wall defining at least a portion of the space A. That is, at least a portion of the plate A may be a wall forming the space A, or the plate A may be a wall forming at least a portion of the space A. In the present disclosure, a central portion of the object may be defined as a central portion among three divided portions when the object is divided into three sections based on the longitudinal direction of the object. A periphery of the object may be defined as a portion disposed at a left or right side of the central portion among the three divided portions. The periphery of the object may include a surface that is in contact with the central portion and a surface opposite thereto. The opposite side may be defined as a border or edge of the object. Examples of the object may include a vacuum adiabatic body, a plate, a heat transfer resistor, a support, a vacuum space, and various components to be introduced in the present disclosure. In the present disclosure, a degree of heat transfer resistance may indicate a degree to which an object resists heat transfer and may be defined as a value determined by a shape including a thickness of the object, a material of the object, and a processing method of the object. The degree of the heat transfer resistance may be defined as the sum of a degree of conduction resistance, a degree of radiation resistance, and a degree of convection resistance. The vacuum adiabatic body according to the present disclosure may include a heat transfer path defined between spaces having different temperatures, or a heat transfer path defined between plates having different temperatures. For example, the vacuum adiabatic body according to the present disclosure may include a heat transfer path through which cold is transferred from a low-temperature plate to a high-temperature plate. In the present disclosure, when a curved portion includes a first portion extending in a first direction and a second portion extending in a second direction different from the first direction, the curved portion may be defined as a portion that connects the first portion to the second portion (including 90 degrees).

In the present disclosure, the vacuum adiabatic body may optionally include a component coupling portion. The component coupling portion may be defined as a portion provided on the plate to which components are connected to each other. The component connected to the plate may be defined as a penetration portion disposed to pass through at least a portion of the plate and a surface component disposed to be connected to a surface of at least a portion of the plate. At least one of the penetration component or the surface component may be connected to the component coupling portion. The penetration component may be a component that defines a path through which a fluid (electricity, refrigerant, water, air, etc.) passes mainly. In the present disclosure, the fluid is defined as any kind of flowing material. The fluid includes moving solids, liquids, gases, and electricity. For example, the component may be a component that defines a path through which a refrigerant for heat exchange passes, such as a suction line heat exchanger (SLHX) or a refrigerant tube. The component may be an electric wire that supplies electricity to an apparatus. As another example, the component may be a component that defines a path through which air passes, such as a cold duct, a hot air duct, and an exhaust port. As another example, the component may be a path through which a fluid such as coolant, hot water, ice, and defrost water pass. The surface component may include at least one of a peripheral adiabatic body, a side panel, injected foam, a pre-prepared resin, a hinge, a latch, a basket, a drawer, a shelf, a light, a sensor, an evaporator, a front decor, a hotline, a heater, an exterior cover, or another adiabatic body.

As an example to which the vacuum adiabatic body is applied, the present disclosure may include an apparatus having the vacuum adiabatic body. Examples of the apparatus may include an appliance. Examples of the appliance may include home appliances including a refrigerator, a cooking appliance, a washing machine, a dishwasher, and an air conditioner, etc. As an example in which the vacuum adiabatic body is applied to the apparatus, the vacuum adiabatic body may constitute at least a portion of a body and a door of the apparatus. As an example of the door, the vacuum adiabatic body may constitute at least a portion of a general door and a door-in-door (DID) that is in direct contact with the body. Here, the door-in-door may mean a small door placed inside the general door. As another example to which the vacuum adiabatic body is applied, the present disclosure may include a wall having the vacuum adiabatic body. Examples of the wall may include a wall of a building, which includes a window.

Hereinafter, the present disclosure will be described in detail with reference to the accompanying drawings. Each of the drawings accompanying the embodiment may be different from, exaggerated, or simply indicated from an actual article, and detailed components may be indicated with simplified features. The embodiment should not be interpreted as being limited only to the size, structure, and shape presented in the drawings. In the embodiments accompanying each of the drawings, unless the descriptions conflict with each other, some configurations in the drawings of one embodiment may be applied to some configurations of the drawings in another embodiment, and some structures in one embodiment may be applied to some structures in another embodiment. In the description of the drawings for the embodiment, the same reference numerals may be assigned to different drawings as reference numerals of specific components constituting the embodiment. Components having the same reference number may perform the same function. For example, the first plate constituting the vacuum adiabatic body has a portion corresponding to the first space throughout all embodiments and is indicated by reference number 10. The first plate may have the same number for all embodiments and may have a portion corresponding to the first space, but the shape of the first plate may be different in each embodiment. Not only the first plate, but also the side plate, the second plate, and another adiabatic body may be understood as well.

FIG. 1 is a perspective view of a refrigerator according to an embodiment, and FIG. 2 is a schematic view illustrating a vacuum adiabatic body used for a body and a door of the refrigerator. Referring to FIG. 1, the refrigerator 1 includes a main body 2 provided with a cavity 9 capable of storing storage goods and a door 3 provided to open and close the main body 2. The door 3 may be rotatably or slidably disposed to open or close the cavity 9. The cavity 9 may provide at least one of a refrigerating compartment and a freezing compartment. A cold source that supplies cold to the cavity may be provided. For example, the cold source may be an evaporator 7 that evaporates the refrigerant to take heat. The evaporator 7 may be connected to a compressor 4 that compresses the refrigerant evaporated to the cold source. The evaporator 7 may be connected to a condenser 5 that condenses the compressed refrigerant to the cold source. The evaporator 7 may be connected to an expander 6 that expands the refrigerant condensed in the cold source. A fan corresponding to the evaporator and the condenser may be provided to promote heat exchange. As another example, the cold source may be a heat absorption surface of a thermoelectric element. A heat absorption sink may be connected to the heat absorption surface of the thermoelectric element. A heat sink may be connected to a heat radiation surface of the thermoelectric element. A fan corresponding to the heat absorption surface and the heat generation surface may be provided to promote heat exchange.

Referring to FIG. 2, plates 10, 15, and 20 may be walls defining the vacuum space. The plates may be walls that partition the vacuum space from an external space of the vacuum space. An example of the plates is as follows. The present disclosure may be any one of the following examples or a combination of two or more examples.

The plate may be provided as one portion or may be provided to include at least two portions connected to each other. As a first example, the plate may include at least two portions connected to each other in a direction along a wall defining the vacuum space. Any one of the two portions may include a portion (e.g., a first portion) defining the vacuum space. The first portion may be a single portion or may include at least two portions that are sealed to each other. The other one of the two portions may include a portion (e.g., a second portion) extending from the first portion of the first plate in a direction away from the vacuum space or extending in an inner direction of the vacuum space. As a second example, the plate may include at least two layers connected to each other in a thickness direction of the plate. Any one of the two layers may include a layer (e.g., the first portion) defining the vacuum space. The other one of the two layers may include a portion (e.g., the second portion) provided in an external space (e.g., a first space and a second space) of the vacuum space. In this case, the second portion may be defined as an outer cover of the plate. The other one of the two layers may include a portion (e.g., the second portion) provided in the vacuum space. In this case, the second portion may be defined as an inner cover of the plate.

The plate may include a first plate 10 and a second plate 20. One surface of the first plate (the inner surface of the first plate) provides a wall defining the vacuum space, and the other surface (the outer surface of the first plate) of the first plate A wall defining the first space may be provided. The first space may be a space provided in the vicinity of the first plate, a space defined by the apparatus, or an internal space of the apparatus. In this case, the first plate may be referred to as an inner case. When the first plate and the additional member define the internal space, the first plate and the additional member may be referred to as an inner case. The inner case may include two or more layers. In this case, the layers may be referred to as a first inner case, a second inner case, etc., or one of the plurality of layers may be referred to as an inner panel. One surface of the second plate (the inner surface of the second plate) provides a wall defining the vacuum space, and the other surface (the outer surface of the first plate) of the second plate A wall defining the second space may be provided. The second space may be a space provided in vicinity of the second plate, another space defined by the apparatus, or an external space of the apparatus. In this case, the second plate may be referred to as an outer case. When the second plate and the additional member define the external space, the second plate and the additional member may be referred to as an outer case. The outer case may include two or more layers. In this case, one of the plurality of layers may be referred to as an outer panel. The second space may be a space having a temperature higher than that of the first space or a space having a temperature lower than that of the first space. Optionally, the plate may include a side plate 15. In FIG. 2, the side plate may also perform a function of a conductive resistance sheet

60 to be described later, according to the disposition of the side plate. The side plate may include a portion extending in a height direction of a space defined between the first plate and the second plate or a portion extending in a height direction of the vacuum space. One surface of the side plate may provide a wall defining the vacuum space, and the other surface of the side plate may provide a wall defining an external space of the vacuum space. The external space of the vacuum space may be at least one of the first space or the second space or a space in which another adiabatic body to be described later is disposed. The side plate may be integrally provided by extending at least one of the first plate or the second plate or a separate component connected to at least one of the first plate or the second plate.

The plate may optionally include a curved portion. In the present disclosure, the plate including a curved portion may be referred to as a bent plate. The curved portion may include at least one of the first plate, the second plate, the side plate, between the first plate and the second plate, between the first plate and the side plate, or between the second plate and the side plate. The plate may include at least one of a first curved portion or a second curved portion, an example of which is as follows. First, the side plate may include the first curved portion. A portion of the first curved portion may include a portion connected to the first plate. Another portion of the first curved portion may include a portion connected to the second curved portion. In this case, a curvature radius of each of the first curved portion and the second curved portion may be large. The other portion of the first curved portion may be connected to an additional straight portion or an additional curved portion, which are provided between the first curved portion and the second curved portion. In this case, a curvature radius of each of the first curved portion and the second curved portion may be small. Second, the side plate may include the second curved portion. A portion of the second curved portion may include a portion connected to the second plate. The other portion of the second curved portion may include a portion connected to the first curved portion. In this case, a curvature radius of each of the first curved portion and the second curved portion may be large. The other portion of the second curved portion may be connected to an additional straight portion or an additional curved portion, which are provided between the first curved portion and the second curved portion. In this case, a curvature radius of each of the first curved portion and the second curved portion may be small. Here, the straight portion may be defined as a portion having a curvature radius greater than that of the curved portion. The straight portion may be understood as a portion having a perfect plane or a curvature radius greater than that of the curved portion. Third, the first plate may include the first curved portion. A portion of the first curved portion may include a portion connected to the side plate. A portion connected to the side plate may be provided at a position that is away from the second plate at a portion at which the first plate extends in the longitudinal direction of the vacuum space. Fourth, the second plate may include the second curved portion. A portion of the second curved portion may include a portion connected to the side plate. A portion connected to the side plate may be provided at a position that is away from the first plate at a portion at which the second plate extends in the longitudinal direction of the vacuum space. The present disclosure may include a combination of any one of the first and second examples described above and any one of the third and fourth examples described above.

In the present disclosure, the vacuum space 50 may be defined as a third space. The vacuum space may be a space in which a vacuum pressure is maintained. In the present disclosure, the expression that a vacuum degree of A is higher than that of B means that a vacuum pressure of A is lower than that of B.

In the present disclosure, the seal 61 may be a portion provided between the first plate and the second plate. Examples of sealing are as follows. The present disclosure may be any one of the following examples or a combination of two or more examples. The sealing may include fusion welding for coupling the plurality of objects by melting at least a portion of the plurality of objects. For example, the first plate and the second plate may be welded by laser welding in a state in which a melting bond such as a filler metal is not interposed therebetween, a portion of the first and second plates and a portion of the component coupling portion may be welded by high-frequency brazing or the like, or a plurality of objects may be welded by a melting bond that generates heat. The sealing may include pressure welding for coupling the plurality of objects by a mechanical pressure applied to at least a portion of the plurality of objects. For example, as a component connected to the component coupling portion, an object made of a material having a degree of deformation resistance less than that of the plate may be pressure-welded by a method such as pinch-off.

A machine room 8 may be optionally provided outside the vacuum adiabatic body. The machine room may be defined as a space in which components connected to the cold source are accommodated. Optionally, the vacuum adiabatic body may include a port 40. The port may be provided at any one side of the vacuum adiabatic body to discharge air of the vacuum space 50. Optionally, the vacuum adiabatic body may include a conduit 64 passing through the vacuum space 50 to install components connected to the first space and the second space.

FIG. 3 is a view illustrating an example of a support that maintains the vacuum space. An example of the support is as follows. The present disclosure may be any one of the following examples or a combination of two or more examples.

The supports 30, 31, 33, and 35 may be provided to support at least a portion of the plate and a heat transfer resistor to be described later, thereby reducing deformation of at least some of the vacuum space 50, the plate, and the heat transfer resistor to be described later due to external force. The external force may include at least one of a vacuum pressure or external force excluding the vacuum pressure. When the deformation occurs in a direction in which a height of the vacuum space is lower, the support may reduce an increase in at least one of radiant heat conduction, gas heat conduction, surface heat conduction, or support heat conduction, which will be described later. The support may be an object provided to maintain a gap between the first plate and the second plate or an object provided to support the heat transfer resistor. The support may have a degree of deformation resistance greater than that of the plate or be provided to a portion having weak degree of deformation resistance among portions constituting the vacuum adiabatic body, the apparatus having the vacuum adiabatic body, and the wall having the vacuum adiabatic body. According to an embodiment, a degree of deformation resistance represents a degree to which an object resists deformation due to external force applied to the object and is a value determined by a shape including a thickness of the object, a material of the object, a processing method of the object, and the like. Examples of the portions having the weak degree of deformation resistance include the vicinity of the curved portion defined by the plate, at least a portion of the curved portion, the vicinity of an opening defined in the body of the apparatus, which is provided by the plate, or at least a portion of the opening. The support may be disposed to surround at least a portion of the curved portion or the opening or may be provided to correspond to the shape of the curved portion or the opening. However, it is not excluded that the support is provided in other portions. The opening may be understood as a portion of the apparatus including the body and the door capable of opening or closing the opening defined in the body.

An example in which the support is provided to support the plate is as follows. First, at least a portion of the support may be provided in a space defined inside the plate. The plate may include a portion including a plurality of layers, and the support may be provided between the plurality of layers. Optionally, the support may be provided to be connected to at least a portion of the plurality of layers or be provided to support at least a portion of the plurality of layers. Second, at least a portion of the support may be provided to be connected to a surface defined on the outside of the plate. The support may be provided in the vacuum space or an external space of the vacuum space. For example, the plate may include a plurality of layers, and the support may be provided as any one of the plurality of layers. Optionally, the support may be provided to support the other one of the plurality of layers. For example, the plate may include a plurality of portions extending in the longitudinal direction, and the support may be provided as any one of the plurality of portions. Optionally, the support may be provided to support the other one of the plurality of parts. As further another example, the support may be provided in the vacuum space or the external space of the vacuum space as a separate component, which is distinguished from the plate. Optionally, the support may be provided to support at least a portion of a surface defined on the outside of the plate. Optionally, the support may be provided to support one surface of the first plate and one surface of the second plate, and one surface of the first plate and one surface of the second plate may be provided to face each other. Third, the support may be provided to be integrated with the plate. An example in which the support is provided to support the heat transfer resistor may be understood instead of the example in which the support is provided to support the plate. A duplicated description will be omitted.

An example of the support in which heat transfer through the support is designed to be reduced is as follows. First, at least a portion of the components disposed in the vicinity of the support may be provided so as not to be in contact with the support or provided in an empty space provided by the support. Examples of the components include a tube or component connected to the heat transfer resistor to be described later, an exhaust port, a getter port, a tube or component passing through the vacuum space, or a tube or component of which at least a portion is disposed in the vacuum space. Examples of the empty space may include an empty space provided in the support, an empty space provided between the plurality of supports, and an empty space provided between the support and a separate component that is distinguished from the support. Optionally, at least a portion of the component may be disposed in a through-hole defined in the support, be disposed between the plurality of bars, be disposed between the plurality of connection plates, or be disposed between the plurality of support plates. Optionally, at least a portion of the component may be disposed in a spaced space between the plurality bars, be disposed in a spaced space between the plurality of connection plates, or be disposed in a spaced space between the plurality of support plates. Second, the adiabatic body may be provided on at least a portion of the support or in the vicinity of at least a portion of the support. The adiabatic body may be provided to be in contact with the support or provided so as not to be in contact with the support. The adiabatic body may be provided at a portion in which the support and the plate are in contact with each other. The adiabatic body may be provided on at least a portion of one surface and the other surface of the support or be provided to cover at least a portion of one surface and the other surface of the support. The adiabatic body may be provided on at least a portion of a periphery of one surface and a periphery of the other surface of the support or be provided to cover at least a portion of a periphery of one surface and a periphery of the other surface of the support. The support may include a plurality of bars, and the adiabatic body may be disposed on an area from a point at which any one of the plurality of bars is disposed to a midpoint between the one bar and the surrounding bars. Third, when cold is transferred through the support, a heat source may be disposed at a position at which the heat adiabatic body described in the second example is disposed. When a temperature of the first space is lower than a temperature of the second space, the heat source may be disposed on the second plate or in the vicinity of the second plate. When heat is transmitted through the support, a cold source may be disposed at a position at which the heat adiabatic body described in the second example is disposed. When a temperature of the first space is higher than a temperature of the second space, the cold source may be disposed on the second plate or in the vicinity of the second plate. As fourth example, the support may include a portion having heat transfer resistance higher than a metal or a portion having heat transfer resistance higher than the plate. The support may include a portion having heat transfer resistance less than that of another adiabatic body. The support may include at least one of a non-metal material, PPS, and glass fiber (GF), low outgassing PC, PPS, or LCP. This is done for a reason in which high compressive strength, low outgassing, and a water absorption rate, low thermal conductivity, high compressive strength at a high temperature, and excellent workability are being capable of obtained.

Examples of the support may be the bars 30 and 31, the connection plate 35, the support plate 35, a porous material 33, and a filler 33. In this embodiment, the support may include any one of the above examples, or an example in which at least two examples are combined. As first example, the support may include bars 30 and 31. The bar may include a portion extending in a direction in which the first plate and the second plate are connected to each other to support a gap between the first plate and the second plate. The bar may include a portion extending in a height direction of the vacuum space and a portion extending in a direction that is substantially perpendicular to the direction in which the plate extends. The bar may be provided to support only one of the first plate and the second plate or may be provided both the first plate and the second plate. For example, one surface of the bar may be provided to support a portion of the plate, and the other surface of the bar may be provided so as not to be in contact with the other portion of the plate. As another example, one surface of the bar may be provided to support at least a portion of the plate, and the other surface of the bar may be provided to support the other portion of the plate. The support may include a bar having an empty space therein or a plurality of bars, and an empty space are provided between the plurality of bars. In addition, the support may include a bar, and the bar may be disposed to provide an empty space between the bar and a separate component that is distinguished from the bar. The support may selectively include a connection plate 35 including a portion connected to the bar or a portion connecting the plurality of bars to each other. The connection plate may include a portion extending in the longitudinal direction of the vacuum space or a portion extending in the direction in which the plate extends. An XZ-plane cross-sectional area of the connection plate may be greater than an XZ-plane cross-sectional area of the bar. The connection plate may be provided on at least one of one surface and the other surface of the bar or may be provided between one surface and the other surface of the bar. At least one of one surface and the other surface of the bar may be a surface on which the bar supports the plate. The shape of the connection plate is not limited. The support may include a connection plate having an empty space therein or a plurality of connection plates, and an empty space are provided between the plurality of connection plates. In addition, the support may include a connection plate, and the connection plate may be disposed to provide an empty space between the connection plate and a separate component that is distinguished from the connection plate. As a second example, the support may include a support plate 35. The support plate may include a portion extending in the longitudinal direction of the vacuum space or a portion extending in the direction in which the plate extends. The support plate may be provided to support only one of the first plate and the second plate or may be provided both the first plate and the second plate. For example, one surface of the support plate may be provided to support a portion of the plate, and the other surface of the support plate may be provided so as not to be in contact with the other portion of the plate. As another example, one surface of the support plate may be provided to support at least a portion of the plate, and the other surface of the support plate may be provided to support the other portion of the plate. A cross-sectional shape of the support plate is not limited. The support may include a support plate having an empty space therein or a plurality of support plates, and an empty space are provided between the plurality of support plates. In addition, the support may include a support plate, and the support plate may be disposed to provide an empty space between the support plate and a separate component that is distinguished from the support plate. As a third example, the support may include a porous material 33 or a filler 33. The inside of the vacuum space may be supported by the porous material or the filler. The inside of the vacuum space may be completely filled by the porous material or the filler. The support may include a plurality of porous materials or a plurality of fillers, and the plurality of porous materials or the plurality of fillers may be disposed to be in contact with each other. When an empty space is provided inside the porous material, provided between the plurality of porous materials, or provided between the porous material and a separate component that is distinguished from the porous material, the porous material may be understood as including any one of the aforementioned bar, connection plate, and support plate. When an empty space is provided inside the filler, provided between the plurality of fillers, or provided between the filler and a separate component that is distinguished from the filler, the filler may be understood as including any one of the aforementioned bar, connection plate, and support plate. The support according to the present disclosure may include any one of the above examples or an example in which two or more examples are combined.

Referring to FIG. 3*a*, as an embodiment, the support may include a bar 31 and a connection plate and support plate 35. The connection plate and the supporting plate may be designed separately. Referring to FIG. 3*b*, as an embodiment, the support may include a bar 31, a connection plate and support plate 35, and a porous material 33 filled in the vacuum space. The porous material 33 may have emissivity greater than that of stainless steel, which is a material of the plate, but since the vacuum space is filled, resistance efficiency of radiant heat transfer is high. The porous material may also function as a heat transfer resistor to be described later. More preferably, the porous material may perform a function of a radiation resistance sheet to be described later. Referring to FIG. 3*c*, as an embodiment, the support may include a porous material 33 or a filler 33. The porous material 33 and the filler may be provided in a compressed state to maintain a gap between the vacuum space. The film 34 may be provided in a state in which a hole is punched as, for example, a PE material. The porous material 33 or the filler may perform both a function of the heat transfer resistor and a function of the support, which will be described later. More preferably, the porous material may perform both a function of the radiation resistance sheet and a function of the support to be described later.

FIG. 4 is a view for explaining an example of the vacuum adiabatic body based on heat transfer resistors 32, 33, 60, and 63 (e.g., thermal insulator and a heat transfer resistance body). The vacuum adiabatic body according to the present disclosure may optionally include a heat transfer resistor. An example of the heat transfer resistor is as follows. The present disclosure may be any one of the following examples or a combination of two or more examples.

The heat transfer resistors 32, 33, 60, and 63 may be objects that reduce an amount of heat transfer between the first space and the second space or objects that reduce an amount of heat transfer between the first plate and the second plate. The heat transfer resistor may be disposed on a heat transfer path defined between the first space and the second space or be disposed on a heat transfer path formed between the first plate and the second plate. The heat transfer resistor may include a portion extending in a direction along a wall defining the vacuum space or a portion extending in a direction in which the plate extends. Optionally, the heat transfer resistor may include a portion extending from the plate in a direction away from the vacuum space. The heat transfer resistor may be provided on at least a portion of the periphery of the first plate or the periphery of the second plate or be provided on at least a portion of an edge of the first plate or an edge of the second plate. The heat transfer resistor may be provided at a portion, in which the through-hole is defined, or provided as a tube connected to the through-hole. A separate tube or a separate component that is distinguished from the tube may be disposed inside the tube. The heat transfer resistor may include a portion having heat transfer resistance greater than that of the plate. In this case, adiabatic performance of the vacuum adiabatic body may be further improved. A shield 62 may be provided on the outside of the heat transfer resistor to be insulated. The inside of the heat transfer resistor may be insulated by the vacuum space. The shield may be provided as a porous material or a filler that is in contact with the inside of the heat transfer resistor. The shield may be an adiabatic structure that is exemplified by a separate gasket placed outside the inside of the heat transfer resistor. The heat transfer resistor may be a wall defining the third space.

An example in which the heat transfer resistor is connected to the plate may be understood as replacing the support with the heat transfer resistor in an example in which the support is provided to support the plate. A duplicate description will be omitted. The example in which the heat transfer resistor is connected to the support may be understood as replacing the plate with the support in the example in which the heat transfer resistor is connected to the plate. A duplicate description will be omitted. The example of reducing heat transfer via the heat transfer body may be applied as a substitute the example of reducing the heat transfer via the support, and thus, the same explanation will be omitted.

In the present disclosure, the heat transfer resistor may be one of a radiation resistance sheet 32, a porous material 33, a filler 33, and a conductive resistance sheet. In the present disclosure, the heat transfer resistor may include a combination of at least two of the radiation resistance sheet 32, the porous material 33, the filler 33, and the conductive resistance sheet. As a first example, the heat transfer resistor may include a radiation resistance sheet 32. The radiation resistance sheet may include a portion having heat transfer resistance greater than that of the plate, and the heat transfer resistance may be a degree of resistance to heat transfer by radiation. The support may perform a function of the radiation resistance sheet together. A conductive resistance sheet to be described later may perform the function of the radiation resistance sheet together. As a second example, the heat transfer resistor may include conduction resistance sheets 60 and 63. The conductive resistance sheet may include a portion having heat transfer resistance greater than that of the plate, and the heat transfer resistance may be a degree of resistance to heat transfer by conduction. For example, the conductive resistance sheet may have a thickness less than that of at least a portion of the plate. As another example, the conductive resistance sheet may include one end and the other end, and a length of the conductive resistance sheet may be longer than a straight distance connecting one end of the conductive resistance sheet to the other end of the conductive resistance sheet. As another example, the conductive resistance sheet may include a material having resistance to heat transfer greater than that of the plate by conduction. As another example, the heat transfer resistor may include a portion having a curvature radius less than that of the plate.

Referring to FIG. 4a, for example, a conductive resistance sheet may be provided on a side plate connecting the first plate to the second plate. Referring to FIG. 4b, for example, a conductive resistance sheet 60 may be provided on at least a portion of the first plate and the second plate. A connection frame 70 may be further provided outside the conductive resistance sheet. The connection frame may be a portion from which the first plate or the second plate extends or a portion from which the side plate extends. Optionally, the connection frame 70 may include a portion at which a component for sealing the door and the body and a component disposed outside the vacuum space such as the exhaust port and the getter port, which are required for the exhaust process, are connected to each other. Referring to FIG. 4c, for example, a conductive resistance sheet may be provided on a side plate connecting the first plate to the second plate. The conductive resistance sheet may be installed in a through-hole passing through the vacuum space. The conduit 64 may be provided separately outside the conductive resistance sheet. The conductive resistance sheet may be provided in a pleated shape. Through this, the heat transfer path may be lengthened, and deformation due to a pressure difference may be prevented. A separate shielding member for insulating the conductive resistance sheet 63 may also be provided. The conductive resistance sheet may include a portion having a degree of deformation resistance less than that of at least one of the plate, the radiation resistance sheet, or the support. The radiation resistance sheet may include a portion having a degree of deformation resistance less than that of at least one of the plate or the support. The plate may include a portion having a degree of deformation resistance less than that of the support. The conductive resistance sheet may include a portion having conductive heat transfer resistance greater than that of at least one of the plate, the radiation resistance sheet, or the support. The radiation resistance sheet may include a portion having radiation heat transfer resistance greater than that of at least one of the plate, the conductive resistance sheet, or the support. The support may include a portion having heat transfer resistance greater than that of the plate. For example, at least one of the plate, the conductive resistance sheet, or the connection frame may include stainless steel material, the radiation resistance sheet may include aluminum, and the support may include a resin material.

FIG. 5 is a graph for observing a process of exhausting the inside of the vacuum adiabatic body with a time and pressure when the support is used. An example of a vacuum adiabatic body vacuum exhaust process vacuum is as follows. The present disclosure may be any one of the following examples or a combination of two or more examples.

While the exhaust process is being performed, an outgassing process, which is a process in which a gas of the vacuum space is discharged, or a potential gas remaining in the components of the vacuum adiabatic body is discharged, may be performed. As an example of the outgassing process, the exhaust process may include at least one of heating or drying the vacuum adiabatic body, providing a vacuum pressure to the vacuum adiabatic body, or providing a getter to the vacuum adiabatic body. In this case, it is possible to promote the vaporization and exhaust of the potential gas remaining in the component provided in the vacuum space. The exhaust process may include a process of cooling the vacuum adiabatic body. The cooling process may be performed after the process of heating or drying the vacuum adiabatic body is performed. The process of heating or drying the vacuum adiabatic body process of providing the vacuum pressure to the vacuum adiabatic body may be performed together. The process of heating or drying the vacuum adiabatic body and the process of providing the getter to the vacuum adiabatic body may be performed together. After the process of heating or drying the vacuum adiabatic body is performed, the process of cooling the vacuum adiabatic body may be performed. The process of providing the vacuum pressure to the vacuum adiabatic body and the process of providing the getter to the vacuum adiabatic body may be performed so as not to overlap each other. For example, after the process of providing the vacuum pressure to the vacuum adiabatic body is performed, the process of providing the getter to the vacuum adiabatic body may be performed. When the vacuum pressure is provided to the vacuum adiabatic body, a pressure of the vacuum space may drop to a certain level and then no longer drop. Here, after stopping the process of providing the vacuum pressure to the vacuum adiabatic body, the getter may be input. As an example of stopping the process of providing the vacuum pressure to the vacuum adiabatic body, an operation of a vacuum pump connected to the vacuum space may be stopped. When inputting the getter, the process of heating or drying the vacuum adiabatic body may be performed together. Through this, the outgassing may be promoted. As another example, after the process of providing the getter to the vacuum adiabatic body is performed, the process of providing the vacuum pressure to the vacuum adiabatic body may be performed.

The time during which the vacuum adiabatic body vacuum exhaust process is performed may be referred to as a vacuum exhaust time. The vacuum exhaust time includes at least one of a time $\Delta 1$ during which the process of heating or drying the vacuum adiabatic body is performed, a time $\Delta t2$ during which the process of maintaining the getter in the vacuum adiabatic body is performed, of a time $\Delta t3$ during which the process of cooling the vacuum adiabatic body is performed. Examples of times $\Delta t1$, $\Delta t2$, and $\Delta t3$ are as follows. The present disclosure may be any one of the following examples or a combination of two or more examples. In the vacuum adiabatic body vacuum exhaust process, the time $\Delta t1$ may be a time $t1a$ or more and a time $t1b$ or less. As a first example, the time $t1a$ may be greater than or equal to about 0.2 hr and less than or equal to about 0.5 hr. The time $t1b$ may be greater than or equal to about 1 hr and less than or equal to about 24.0 hr. The time $\Delta t1$ may be about 0.3 hr or more and about 12.0 hr or less. The time $\Delta t1$ may be about 0.4 hr or more and about 8.0 hr or less. The time $\Delta t1$ may be about 0.5 hr or more and about 4.0 hr or less. In this case, even if the $\Delta t1$ is kept as short as possible, the sufficient outgassing may be applied to the vacuum adiabatic body. For example, this case may include a case in which a component of the vacuum adiabatic body, which is exposed to the vacuum space, among the components of the vacuum adiabatic body, has an outgassing rate (%) less than that of any one of the component of the vacuum adiabatic body, which is exposed to the external space of the vacuum space. Specifically, the component exposed to the vacuum space may include a portion having a outgassing rate less than that of a thermoplastic polymer. More specifically, the support or the radiation resistance sheet may be disposed in the vacuum space, and the outgassing rate of the support may be less than that of the thermoplastic plastic. As another example, this case may include a case in which a component of the vacuum adiabatic body, which is exposed to the vacuum space, among the components of the vacuum adiabatic body, has a max operating temperature (° C.) greater than that of any one of the component of the vacuum adiabatic body, which is exposed to the external space of the vacuum space. In this case, the vacuum adiabatic body may be heated to a higher temperature to increase in outgassing rate. For example, the component exposed to the vacuum space may include a portion having an operating temperature greater than that of the thermoplastic polymer. As a more specific example, the support or the radiation resistance sheet may be disposed in the vacuum space, and a use temperature of the support may be higher than that of the thermoplastic plastic. As another example, among the components of the vacuum adiabatic body, the component exposed to the vacuum space may contain more metallic portion than a non-metallic portion. That is, a mass of the metallic portion may be greater than a mass of the non-metallic portion, a volume of the metallic portion may be greater than a volume of the non-metallic portion, or an area of the metallic portion exposed to the vacuum space may be greater than an area exposed to the non-metallic portion of the vacuum space. When the components exposed to the vacuum space are provided in plurality, the sum of the volume of the metal material included in the first component and the volume of the metal material included in the second component may be greater than that of the volume of the non-metal material included in the first component and the volume of the non-metal material included in the second component. When the components exposed to the vacuum space are provided in plurality, the sum of the mass of the metal material included in the first component and the mass of the metal material included in the second component may be greater than that of the mass of the non-metal material included in the first component and the mass of the non-metal material included in the second component. When the components exposed to the vacuum space are provided in plurality, the sum of the area of the metal material, which is exposed to the vacuum space and included in the first component, and an area of the metal material, which is exposed to the vacuum space and included in the second component, may be greater than that of the area of the non-metal material, which is exposed to the vacuum space and included in the first component, and an area of the non-metal material, which is exposed to the vacuum space and included in the second component. As a second example, the time $t1a$ may be greater than or equal to about 0.5 hr and less than or equal to about 1 hr. The time $t1b$ may be greater than or equal to about 24.0 hr and less than or equal to about 65 hr. The time $\Delta t1$ may be about 1.0 hr or more and about 48.0 hr or less. The time $\Delta t1$ may be about 2 hr or more and about 24.0 hr or less. The time $\Delta t1$ may be about 3 hr or more and about 12.0 hr or less. In this case, it may be the vacuum adiabatic body that needs to maintain the $\Delta t1$ as long as possible. In this case, a case opposite to the examples described in the first example or a case in which the component exposed to the vacuum space is made of a thermoplastic material may be an example. A duplicated description will be omitted. In the vacuum adiabatic body vacuum exhaust process, the time $\Delta t1$ may be a time $t1a$ or more and a time $t1b$ or less. The time $t2a$ may be greater than or equal to about 0.1 hr and less than or equal to about 0.3 hr. The time $t2b$ may be greater than or equal to about 1 hr and less than or equal to about 5.0 hr. The time $\Delta t2$ may be about 0.2 hr or more and about 3.0 hr or less. The time $\Delta t2$ may be about 0.3 hr or more and about 2.0 hr or less. The time $\Delta t2$ may be about 0.5 hr or more and about 1.5 hr or less. In this case, even if the time $\Delta t2$ is kept as short as possible, the sufficient outgassing through the getter may be applied to the vacuum adiabatic body. In the vacuum adiabatic body vacuum exhaust process, the time $\Delta t3$ may be a time $t3a$ or more and a time $t3b$ or less. The time $t2a$ may be greater than or equal to about 0.2 hr and less than or equal to about 0.8 hr. The time $t2b$ may be greater than or equal to about 1 hr and less than or equal to about 65.0 hr. The time $\Delta t3$ may be about 0.2 hr or more and about 48.0 hr or less. The time $\Delta t3$ may be about 0.3 hr or more and about 24.0 hr or less. The time $\Delta t3$ may be about 0.4 hr or more and about 12.0 hr or less. The time $\Delta t3$ may be about 0.5 hr or more and about 5.0 hr or less. After the heating or drying process is performed during the exhaust process, the cooling process may be performed. For example, when the heating or drying process is performed for a long time, the time $\Delta t3$ may be long. The vacuum adiabatic body according to the present disclosure may be manufactured so that the time $\Delta t1$ is greater than the time $\Delta t2$, the time $\Delta t1$ is less than or equal to the time $\Delta t3$, or the time $\Delta t3$ is greater than the time $\Delta t2$. The following relational expression is satisfied: $\Delta t2<\Delta t1<\Delta t3$. The vacuum adiabatic body according to an embodiment may be manufactured so that the relational expression: $\Delta t1+\Delta t2+\Delta t3$ may be greater than or equal to about 0.3 hr and less than or equal to about 70 hr, be greater than or equal to about 1 hr and less than or equal to about 65 hr, or be greater than or equal to about 2 hr and less than or equal to about 24 hr. The relational expression: Δt1+Δt2+Δt3 may be manufactured to be greater than or equal to about 3 hr and less than or equal to about 6 hr.

An example of the vacuum pressure condition during the exhaust process is as follows. The present disclosure may be any one of the following examples or a combination of two or more examples. A minimum value of the vacuum pressure in the vacuum space during the exhaust process may be greater than about 1.8E-6 Torr. The minimum value of the vacuum pressure may be greater than about 1.8E-6 Torr and less than or equal to about 1.0E-4 Torr, be greater than about 0.5E-6 Torr and less than or equal to about 1.0E-4 Torr, or be greater than about 0.5E-6 Torr and less than or equal to about 0.5E-5 Torr. The minimum value of the vacuum pressure may be greater than about 0.5E-6 Torr and less than about 1.0E-5 Torr. As such, the limitation in which the minimum value of the vacuum pressure provided during the exhaust process is because, even if the pressure is reduced through the vacuum pump during the exhaust process, the decrease in vacuum pressure is slowed below a certain level. As an embodiment, after the exhaust process is performed, the vacuum pressure of the vacuum space may be maintained at a pressure greater than or equal to about 1.0E-5 Torr and less than or equal to about 5.0E-1 Torr. The maintained vacuum pressure may be greater than or equal to about 1.0E-5 Torr and less than or equal to about 1.0E-1 Torr, be greater than or equal to about 1.0E-5 Torr and less than or equal to about 1.0E-2 Torr, be greater than or equal to about 1.0E-4 Torr and less than or equal to about 1.0E-2 Torr, or be greater than or equal to about 1.0E-5 Torr and less than or equal to about 1.0E-3 Torr. As a result of predicting the change in vacuum pressure with an accelerated experiment of two example products, one product may be provided so that the vacuum pressure is maintained below about 1.0E-04 Torr even after about 16.3 years, and the other product may be provided so that the vacuum pressure is maintained below about 1.0E-04 Torr even after about 17.8 years. As described above, the vacuum pressure of the vacuum adiabatic body may be used industrially only when it is maintained below a predetermined level even if there is a change over time.

FIG. 5a is a graph of an elapsing time and pressure in the exhaust process according to an example, and FIG. 5b is a view explaining results of a vacuum maintenance test in the acceleration experiment of the vacuum adiabatic body of the refrigerator having an internal volume of about 128 liters. Referring to FIG. 5b, it is seen that the vacuum pressure gradually increases according to the aging. For example, it is confirmed that the vacuum pressure is about 6.7E-04 Torr after about 4.7 years, about 1.7E-03 Torr after about 10 years, and about 1.0E-02 Torr after about 59 years. According to these experimental results, it is confirmed that the vacuum adiabatic body according to the embodiment is sufficiently industrially applicable.

FIG. 6 is a graph illustrating results obtained by comparing the vacuum pressure with gas conductivity. Referring to FIG. 6, gas conductivity with respect to the vacuum pressure depending on a size of the gap in the vacuum space 50 was represented as a graph of effective heat transfer coefficient (eK). The effective heat transfer coefficient (eK) was measured when the gap in the vacuum space 50 has three values of about 3 mm, about 4.5 mm, and about 9 mm. The gap in the vacuum space 50 is defined as follows. When the radiation resistance sheet 32 exists inside surface vacuum space 50, the gap is a distance between the radiation resistance sheet 32 and the plate adjacent thereto. When the radiation resistance sheet 32 does not exist inside surface vacuum space 50, the gap is a distance between the first and second plates. It was seen that, since the size of the gap is small at a point corresponding to a typical effective heat transfer coefficient of about 0.0196 W/mK, which is provided to an adiabatic material formed by foaming polyurethane, the vacuum pressure is about 5.0E-1 Torr even when the size of the gap is about 3 mm. Meanwhile, it was seen that the point at which reduction in adiabatic effect caused by the gas conduction heat is saturated even though the vacuum pressure decreases is a point at which the vacuum pressure is approximately 4.5E-3 Torr. The vacuum pressure of about 4.5E-3 Torr may be defined as the point at which the reduction in adiabatic effect caused by the gas conduction heat is saturated. Also, when the effective heat transfer coefficient is about 0.01 W/mK, the vacuum pressure is about 1.2E-2 Torr. An example of a range of the vacuum pressure in the vacuum space according to the gap is presented. The support may include at least one of a bar, a connection plate, or a support plate. In this case, when the gap of the vacuum space is greater than or equal to about 3 mm, the vacuum pressure may be greater than or equal to A and less than about 5E-1 Torr, or be greater than about 2.65E-1 Torr and less than about 5E-1 Torr. As another example, the support may include at least one of a bar, a connection plate, or a support plate. In this case, when the gap of the vacuum space is greater than or equal to about 4.5 mm, the vacuum pressure may be greater than or equal to A and less than about 3E-1 Torr, or be greater than about 1.2E-2 Torr and less than about 5E-1 Torr. As another example, the support may include at least one of a bar, a connection plate, or a support plate, and when the gap of the vacuum space is greater than or equal to about 9 mm, the vacuum pressure may be greater than or equal to A and less than about $1.0 \times 10^{\wedge}-1$ Torr or be greater than about 4.5E-3 Torr and less than about 5E-1 Torr. Here, the A may be greater than or equal to about $1.0 \times 10^{\wedge}-6$ Torr and less than or equal to about 1.0E-5 Torr. The A may be greater than or equal to about $1.0 \times 10^{\wedge}-5$ Torr and less than or equal to about 1.0E-4 Torr. When the support includes a porous material or a filler, the vacuum pressure may be greater than or equal to about 4.7E-2 Torr and less than or equal to about 5E-1 Torr. In this case, it is understood that the size of the gap ranges from several micrometers to several hundreds of micrometers. When the support and the porous material are provided together in the vacuum space, a vacuum pressure may be created and used, which is middle between the vacuum pressure when only the support is used and the vacuum pressure when only the porous material is used.

FIG. 7 is a view illustrating various examples of the vacuum space. The present disclosure may be any one of the following examples or a combination of two or more examples.

Referring to FIG. 7, the vacuum adiabatic body according to the present disclosure may include a vacuum space. The vacuum space 50 may include a first vacuum space extending in a first direction (e.g., X-axis) and having a predetermined height. The vacuum space 50 may optionally include a second vacuum space (hereinafter, referred to as a vacuum space expansion portion) different from the first vacuum space in at least one of the height or the direction. The vacuum space expansion portion may be provided by allowing at least one of the first and second plates or the side plate to extend. In this case, the heat transfer resistance may increase by lengthening a heat conduction path along the plate. The vacuum space expansion portion in which the second plate extends may reinforce adiabatic performance of a front portion of the vacuum adiabatic body. The vacuum space expansion portion in which the second plate extends may reinforce adiabatic performance of a rear portion of the vacuum adiabatic body, and the vacuum space expansion portion in which the side plate extends may reinforce adiabatic performance of a side portion of the vacuum adiabatic body. Referring to FIG. 7a, the second plate may extend to provide the vacuum space expansion portion 51. The second plate may include a second portion 202 extending from a first portion 201 defining the vacuum space 50 and the vacuum space expansion portion 51. The second portion 202 of the second plate may branch a heat conduction path along the second plate to increase in heat transfer resistance. Referring to FIG. 7b, the side plate may extend to provide the vacuum space expansion portion. The side plate may include a second portion 152 extending from a first portion 151 defining the vacuum space 50 and the vacuum space extension portion 51. The second portion of the side plate may branch the heat conduction path along the side plate to improve the adiabatic performance. The first and second portions 151 and 152 of the side plate may branch the heat conduction path to increase in heat transfer resistance. Referring to FIG. 7c, the first plate may extend to provide the vacuum space expansion portion. The first plate may include a second portion 102 extending from the first portion 101 defining the vacuum space 50 and the vacuum space expansion portion 51. The second portion of the first plate may branch the heat conduction path along the second plate to increase in heat transfer resistance. Referring to FIG. 7d, the vacuum space expansion portion 51 may include an X-direction expansion portion 51a and a Y-direction expansion portion 51b of the vacuum space. The vacuum space expansion portion 51 may extend in a plurality of directions of the vacuum space 50. Thus, the adiabatic performance may be reinforced in multiple directions and may increase by lengthening the heat conduction path in the plurality of directions to improve the heat transfer resistance. The vacuum space expansion portion extending in the plurality of directions may further improve the adiabatic performance by branching the heat conduction path. Referring to FIG. 7e, the side plate may provide the vacuum space extension portion extending in the plurality of directions. The vacuum space expansion portion may reinforce the adiabatic performance of the side portion of the vacuum adiabatic body. Referring to FIG. 7f, the first plate may provide the vacuum space extension portion extending in the plurality of directions. The vacuum space expansion portion may reinforce the adiabatic performance of the side portion of the vacuum adiabatic body.

FIG. 8 is a view for explaining another adiabatic body. The present disclosure may be any one of the following examples or a combination of two or more examples. Referring to FIG. 8, the vacuum adiabatic body according to the present disclosure may optionally include another adiabatic body 90. Another adiabatic body may have a degree of vacuum less than that of the vacuum adiabatic body and be an object that does not include a portion having a vacuum state therein. The vacuum adiabatic body and another vacuum adiabatic body may be directly connected to each other or connected to each other through an intermedium. In this case, the intermedium may have a degree of vacuum less than that of at least one of the vacuum adiabatic body or another adiabatic body or may be an object that does not include a portion having the vacuum state therein. When the vacuum adiabatic body includes a portion in which the height of the vacuum adiabatic body is high and a portion in which the height of the vacuum adiabatic body is low, another adiabatic body may be disposed at a portion having the low height of the vacuum adiabatic body. Another adiabatic body may include a portion connected to at least a portion of the first and second plates and the side plate. Another adiabatic body may be supported on the plate or coupled or sealed. A degree of sealing between another adiabatic body and the plate may be lower than a degree of sealing between the plates. Another adiabatic body may include a cured adiabatic body (e.g., PU foaming solution) that is cured after being injected, a pre-molded resin, a peripheral adiabatic body, and a side panel. At least a portion of the plate may be provided to be disposed inside another adiabatic body. Another adiabatic body may include an empty space. The plate may be provided to be accommodated in the empty space. At least a portion of the plate may be provided to cover at least a portion of another adiabatic body. Another adiabatic body may include a member covering an outer surface thereof. The member may be at least a portion of the plate. Another adiabatic body may be an intermedium for connecting, supporting, bonding, or sealing the vacuum adiabatic body to the component. Another adiabatic body may be an intermedium for connecting, supporting, bonding, or sealing the vacuum adiabatic body to another vacuum adiabatic body. Another adiabatic body may include a portion connected to a component coupling portion provided on at least a portion of the plate. Another adiabatic body may include a portion connected to a cover covering another adiabatic body. The cover may be disposed between the first plate and the first space, between the second plate and the second space, or between the side plate and a space other than the vacuum space 50. For example, the cover may include a portion on which the component is mounted. As another example, the cover may include a portion that defines an outer appearance of another adiabatic body. Referring to FIGS. 8a to 8f, another adiabatic body may include a peripheral adiabatic body. The peripheral adiabatic body may be disposed on at least a portion of a periphery of the vacuum adiabatic body, a periphery of the first plate, a periphery of the second plate, and the side plate. The peripheral adiabatic body disposed on the periphery of the first plate or the periphery of the second plate may extend to a portion at which the side plate is disposed or may extend to the outside of the side plate. The peripheral adiabatic body disposed on the side plate may extend to a portion at which the first plate or may extend to the outside of the first plate or the second plate. Referring to FIGS. 8g to 8h, another adiabatic body may include a central adiabatic body. The central adiabatic body may be disposed on at least a portion of a central portion of the vacuum adiabatic body, a central portion of the first plate, or a central portion of the second plate.

Referring to FIG. 8a, the peripheral adiabatic body 92 may be placed on the periphery of the first plate. The peripheral adiabatic body may be in contact with the first plate. The peripheral adiabatic body may be separated from the first plate or further extend from the first plate (indicated by dotted lines). The peripheral adiabatic body may improve the adiabatic performance of the periphery of the first plate. Referring to FIG. 8b, the peripheral adiabatic body may be placed on the periphery of the second plate. The peripheral adiabatic body may be in contact with the second plate. The peripheral adiabatic body may be separated from the second plate or further extend from the second plate (indicated by dotted lines). The periphery adiabatic body may improve the adiabatic performance of the periphery of the second plate. Referring to FIG. 8c, the peripheral adiabatic body may be disposed on the periphery of the side plate. The peripheral adiabatic body may be in contact with the side plate. The peripheral adiabatic body may be separated from the side plate or further extend from the side plate. The peripheral adiabatic body may improve the adiabatic performance of the periphery of the side plate Referring to FIG. 8*d*, the peripheral adiabatic body 92 may be disposed on the periphery of the first plate. The peripheral adiabatic body may be placed on the periphery of the first plate constituting the vacuum space expansion portion 51. The peripheral adiabatic body may be in contact with the first plate constituting the vacuum space extension portion. The peripheral adiabatic body may be separated from or further extend to the first plate constituting the vacuum space extension portion. The peripheral adiabatic body may improve the adiabatic performance of the periphery of the first plate constituting the vacuum space expansion portion. Referring to FIGS. 8*e* and 8*f*, in the peripheral adiabatic body, the vacuum space extension portion may be disposed on a periphery of the second plate or the side plate. The same explanation as in FIG. 8*d* may be applied. Referring to FIG. 8*g*, the central adiabatic body 91 may be placed on a central portion of the first plate. The central adiabatic body may improve adiabatic performance of the central portion of the first plate. Referring to FIG. 8*h*, the central adiabatic body may be disposed on the central portion of the second plate. The central adiabatic body may improve adiabatic performance of the central portion of the second plate.

FIG. 9 is a view for explaining a heat transfer path between first and second plates having different temperatures. An example of the heat transfer path is as follows. The present disclosure may be any one of the following examples or a combination of two or more examples.

The heat transfer path may pass through the extension portion at at least a portion of the first portion 101 of the first plate, the first portion 201 of the second plate, or the first portion 151 of the side plate. The first portion may include a portion defining the vacuum space. The extension portions 102, 152, and 202 may include portions extending in a direction away from the first portion. The extension portion may include a side portion of the vacuum adiabatic body, a side portion of the plate having a higher temperature among the first and second plates, or a portion extending toward the side portion of the vacuum space 50. The extension portion may include a front portion of the vacuum adiabatic body, a front portion of the plate having a higher temperature among the first and second plates, or a front portion extending in a direction away from the front portion of the vacuum space 50. Through this, it is possible to reduce generation of dew on the front portion. The vacuum adiabatic body or the vacuum space 50 may include first and second surfaces having different temperatures from each other. The temperature of the first surface may be lower than that of the second surface. For example, the first surface may be the first plate, and the second surface may be the second plate. The extension portion may extend in a direction away from the second surface or include a portion extending toward the first surface. The extension portion may include a portion, which is in contact with the second surface, or a portion extending in a state of being in contact with the second surface. The extension portion may include a portion extending to be spaced apart from the two surfaces. The extension portion may include a portion having heat transfer resistance greater than that of at least a portion of the plate or the first surface. The extension portion may include a plurality of portions extending in different directions. For example, the extension portion may include a second portion 202 of the second plate and a third portion 203 of the second plate. The third portion may also be provided on the first plate or the side plate. Through this, it is possible to increase in heat transfer resistance by lengthening the heat transfer path. In the extension portion, the above-described heat transfer resistor may be disposed. Another adiabatic body may be disposed outside the extending portion. Through this, the extension portion may reduce generation of dew on the second surface. Referring to FIG. 9*a*, the second plate may include the extension portion extending to the periphery of the second plate. Here, the extension portion may further include a portion extending backward. Referring to FIG. 9*b*, the side plate may include the extension portion extending to a periphery of the side plate. Here, the extension portion may be provided to have a length that is less than or equal to that of the extension portion of the second plate. Here, the extension portion may further include a portion extending backward. Referring to FIG. 9*c*, the first plate may include the extension portion extending to the periphery of the first plate. Here, the extension portion may extend to a length that is less than or equal to that of the extension portion of the second plate. Here, the extension portion may further include a portion extending backward.

FIG. 10 is a view for explaining a branch portion on the heat transfer path between first and second plates having different temperatures. An example of the branch portion is as follows. The present disclosure may be any one of the following examples or a combination of two or more examples.

Optionally, the heat transfer path may pass through portions 205, 153, and 104, each of which is branched from at least a portion of the first plate, the second plate, or the side plate. Here, the branched heat transfer path means a heat transfer path through which heat flows to be separated in a different direction from the heat transfer path through which heat flows along the plate. The branched portion may be disposed in a direction away from the vacuum space 50. The branched portion may be disposed in a direction toward the inside of the vacuum space 50. The branched portion may perform the same function as the extension portion described with reference to FIG. 9, and thus, a description of the same portion will be omitted. Referring to FIG. 10*a*, the second plate may include the branched portion 205. The branched portion may be provided in plurality, which are spaced apart from each other. The branched portion may include a third portion 203 of the second plate. Referring to FIG. 10*b*, the side plate may include the branched portion 153. The branched portion 153 may be branched from the second portion 152 of the side plate. The branched portion 153 may provide at least two. At least two branched portions 153 spaced apart from each other may be provided on the second portion 152 of the side plate. Referring to FIG. 10*c*, the first plate may include the branched portion 104. The branched portion may further extend from the second portion 102 of the first plate. The branched portion may extend toward the periphery. The branched portion 104 may be bent to further extend. A direction in which the branched portion extends in FIGS. 10*a*, 10*b*, and 10*c* may be the same as at least one of the extension directions of the extension portion described in FIG. 10.

FIG. 11 is a view for explaining a process of manufacturing the vacuum adiabatic body.

Optionally, the vacuum adiabatic body may be manufactured by a vacuum adiabatic body component preparation process in which the first plate and the second plate are prepared in advance. Optionally, the vacuum adiabatic body may be manufactured by a vacuum adiabatic body component assembly process in which the first plate and the second plate are assembled. Optionally, the vacuum adiabatic body may be manufactured by a vacuum adiabatic body vacuum exhaust process in which a gas in the space defined between the first plate and the second plate is discharged. Optionally, after the vacuum adiabatic body component preparation process is performed, the vacuum adiabatic body component assembly process or the vacuum adiabatic body exhaust process may be performed. Optionally, after the vacuum adiabatic body component assembly process is performed, the vacuum adiabatic body vacuum exhaust process may be performed. Optionally, the vacuum adiabatic body may be manufactured by the vacuum adiabatic body component sealing process (S3) in which the space between the first plate and the second plate is sealed. The vacuum adiabatic body component sealing process may be performed before the vacuum adiabatic body vacuum exhaust process (S4). The vacuum adiabatic body may be manufactured as an object with a specific purpose by an apparatus assembly process (S5) in which the vacuum adiabatic body is combined with the components constituting the apparatus. The apparatus assembly process may be performed after the vacuum adiabatic body vacuum exhaust process. Here, the components constituting the apparatus means components constituting the apparatus together with the vacuum adiabatic body.

The vacuum adiabatic body component preparation process (S1) is a process in which components constituting the vacuum adiabatic body are prepared or manufactured. Examples of the components constituting the vacuum adiabatic body may include various components such as a plate, a support, a heat transfer resistor, and a tube. The vacuum adiabatic body component assembly process (S2) is a process in which the prepared components are assembled. The vacuum adiabatic body component assembly process may include a process of disposing at least a portion of the support and the heat transfer resistor on at least a portion of the plate. For example, the vacuum adiabatic body component assembly process may include a process of disposing at least a portion of the support and the heat transfer resistor between the first plate and the second plate. Optionally, the vacuum adiabatic body component assembly process may include a process of disposing a penetration component on at least a portion of the plate. For example, the vacuum adiabatic body component assembly process may include a process of disposing the penetration component or a surface component between the first and second plates. After the penetration component may be disposed between the first plate and the second plate, the penetration component may be connected or sealed to the penetration component coupling portion.

An example of a vacuum adiabatic body vacuum exhaust process vacuum is as follows. The present disclosure may be any one of the, examples or a combination of two or more examples. The vacuum adiabatic body vacuum exhaust process may include at least one of a process of inputting the vacuum adiabatic body into an exhaust passage, a getter activation process, a process of checking vacuum leakage and a process of closing the exhaust port. The process of forming the coupling part may be performed in at least one of the vacuum adiabatic body component preparation process, the vacuum adiabatic body component assembly process, or the apparatus assembly process. Before the vacuum adiabatic body exhaust process is performed, a process of washing the components constituting the vacuum adiabatic body may be performed. Optionally, the washing process may include a process of applying ultrasonic waves to the components constituting the vacuum adiabatic body or a process of providing ethanol or a material containing ethanol to surfaces of the components constituting the vacuum adiabatic body. The ultrasonic wave may have an intensity between about 10 kHz and about 50 kHz. A content of ethanol in the material may be about 50% or more. For example, the content of ethanol in the material may range of about 50% to about 90%. As another example, the content of ethanol in the material may range of about 60% to about 80%. As another example, the content of ethanol in the material may be range of about 65% to about 75%. Optionally, after the washing process is performed, a process of drying the components constituting the vacuum adiabatic body may be performed. Optionally, after the washing process is performed, a process of heating the components constituting the vacuum adiabatic body may be performed.

The contents described in FIGS. 1 to 11 may be applied to all or selectively applied to the embodiments described with reference to the drawings below.

As an embodiment, an example of a process associated with a plate is as follows. Any one or two or more examples among following examples of the present disclosure will be described. The vacuum adiabatic body component preparation process may include a process of manufacturing the plate. Before the vacuum adiabatic body vacuum exhaust process is performed, the process of manufacturing the plate may be performed. Optionally, the plate may be manufactured by a metal sheet. For example, a thin and wide plate may be manufactured using plastic deformation. Optionally, the manufacturing process may include a process of molding the plate. The molding process may be applied to the molding of the side plate or may be applied to a process of integrally manufacturing at least a portion of at least one of the first plate and the second plate, and the side plate. For example, the molding may include drawing. The molding process may include a process in which the plate is partially seated on a support. The molding process may include a process of partially applying force to the plate. The molding process may include a process of seating a portion of the plate on the support a process of applying force to the other portion of the plate. The molding process may include a process of deforming the plate. The deforming process may include a process of forming at least one or more curved portions on the plate. The deforming process may include a process of changing a curvature radius of the plate or a process of changing a thickness of the plate. As a first example, the process of changing the thickness may include a process of allowing a portion of the plate to increase in thickness, and the portion may include a portion extending in a longitudinal direction of the internal space (a first straight portion). The portion may be provided in the vicinity of the portion at which the plate is seated on the support in the process of molding the plate. As a second example, the process of changing the thickness may include a process of reducing a thickness of a portion of the plate, and the portion may include a portion extending in a longitudinal direction of the internal space (a second straight portion). The portion may be provided in the vicinity of a portion to which force is applied to the plate in the process of molding the plate. As a third example, the process of changing the thickness may include a process of reducing a thickness of a portion of the plate, and the portion may include a portion extending in a height direction of the internal space (the second straight portion). The portion may be connected to the portion extending in the longitudinal direction of the internal space of the plate. As a fourth example, the process of changing the thickness may include a process of allowing a portion of the plate to increase in thickness, and the portion may include at least one of a portion to which the side plate extends in the longitudinal direction of the internal space and a curved portion provided between the portions extending in the height direction of the internal space (a first curved portion). The curved portion may be provided at the portion seated on the support of the plate or in the vicinity of the portion in the process of molding the plate. As a fifth example, the process of changing the thickness may include a process of allowing a portion of the plate to decrease in thickness, and the portion may include at least one of a portion to which the side plate extends in the longitudinal direction of the internal space and a curved portion provided between the portions extending in the height direction of the internal space (a second curved portion). The curved portion may be provided in the vicinity of a portion to which force is applied to the plate in the process of molding the plate. The deforming process may be any one of the above-described examples or an example in which at least two of the above-described examples are combined.

The process associated with the plate may selectively include a process of washing the plate. An example of a process sequence associated with the process of washing the plate is as follows. The present disclosure may be any one of the following examples or a combination of two or more examples. Before the vacuum adiabatic body vacuum exhaust process is performed, the process of washing the plate may be performed. After the process of manufacturing the plate is performed, at least one of the process of molding the plate and the process of washing the plate may be performed. After the process of molding the plate is performed, the process of washing the plate may be performed. Before the process of molding the plate is performed, the process of washing the plate may be performed. After the process of manufacturing the plate is performed, at least one of a process of providing a component coupling portion to a portion of the plate or the process of washing the plate may be performed. After the process of providing the component coupling portion to a portion of the plate is performed, the process of washing the plate may be performed.

The process associated with the plate selectively include the process of providing the component coupling portion to the plate. An example of a process sequence associated with the process of providing the component coupling portion to the plate is as follows. The present disclosure may be any one of the following examples or a combination of two or more examples. Before the vacuum adiabatic body vacuum exhaust process is performed, a process of providing the component coupling portion to a portion of the plate may be performed. For example, the process of providing the component coupling portion may include a process of manufacturing a tube provided to the component coupling portion. The tube may be connected to a portion of the plate. The tube may be disposed in an empty space provided in the plate or in an empty space provided between the plates. As another example, the process of providing the component coupling portion may include a process of providing a through-hole in a portion of the plate. For another example, the process of providing the component coupling portion may include a process of providing a curved portion to at least one of the plate or the tube.

The process associated with the plate may optionally include a process for sealing the vacuum adiabatic body component associated with the plate. An example of a process sequence associated with the process of sealing the vacuum adiabatic body component associated with the plate is as follows. The present disclosure may be any one of the following examples or a combination of two or more examples. After the process of providing the through-hole in the portion of the plate is performed, at least one of a process of providing a curved portion to at least a portion of the plate or the tube or a process of providing a seal between the plate and the tube may be performed. After the process of providing the curved portion to at least a portion of at least one of the plate or the tube is performed, the process of sealing the gap between the plate and the tube may be performed. The process of providing the through-hole in the portion of the plate and the process of providing the curved portion in at least a portion of the plate and the tube may be performed at the same time. The process of providing a through-hole in a part of the plate and the process of providing the seal between the plate and the tube may be performed at the same time. After the process of providing the curved portion to the tube is performed, the process of providing a through-hole in the portion of the plate may be performed. Before the vacuum adiabatic body vacuum exhaust process is performed, a portion of the tube may be provided and/or sealed to the plate, and after the vacuum adiabatic body vacuum exhaust process is performed, the other portion of the tube may be sealed.

When at least a portion of the plate is used to be integrated with a heat transfer resistor, the example of the process associated with the plate may also be applied to the example of the process of the heat transfer resistor.

Optionally, the vacuum adiabatic body may include a side plate connecting the first plate to the second plate. Examples of the side plate are as follows. The present disclosure may be any one of the following examples or a combination of two or more examples. The side plate may be provided to be integrated with at least one of the first or second plate. The side plate may be provided to be integrated with any one of the first and second plates. The side plate may be provided as any one of the first and second plates. The side plate may be provided as a portion of any one of the first and second plates. The side plate may be provided as a component separated from the other of the first and second plates. In this case, optionally, the side plate may be provided to be coupled or sealed to the other one of the first and second plates. The side plate may include a portion having a degree of strain resistance, which is greater than that of at least a portion of the other one of the first and second plates. The side plate may include a portion having a thickness greater than that of at least a portion of the other one of the first and second plates. The side plate may include a portion having a curvature radius less than that of at least a portion of the other one of the first and second plates.

In a similar example to this, optionally, the vacuum adiabatic body may include a heat transfer resistor provided to reduce a heat transfer amount between a first space provided in the vicinity of the first plate and a second space provided in the vicinity of the second plate. Examples of the heat transfer resistor are as follows. The present disclosure may be any one of the following examples or a combination of two or more examples. The heat transfer resistor may be provided to be integrated with at least one of the first or second plate. The heat transfer resistor may be provided to be integrated with any one of the first and second plates. The heat transfer resistor may be provided as any one of the first and second plates. The heat transfer resistor may be provided as a portion of any one of the first and second plates. The heat transfer resistor may be provided as a component separated from the other one of the first and second plates. In this case, optionally, the heat transfer resistor may be provided to be coupled or sealed to the other one of the first and second plates. The heat transfer resistor may include a portion having a degree of heat transfer resistance, which is greater than that of at least a portion of the other one of the first and second plates. The heat transfer resistor may include a portion having a thickness less than that of at least a portion of the other one of the first and second plates. The heat transfer resistor may include a portion having a curvature radius less than that of at least a portion of the other one of the first and second plates. The heat transfer resistor may include a portion having a curvature radius less than that of at least a portion of the other one of the first and second plates.

The contents described in FIGS. 1 to 11 may be applied to all or selectively applied to the embodiments described with reference to the drawings below.

FIG. 12 is a set of a perspective view and a partial cross-sectional view of a vacuum adiabatic body, FIG. 12a is a diagram showing a vacuum adiabatic body with a left side being a bottom and a right side being a top, FIG. 12b is a sectional perspective view taken along 1-1' of FIG. 12a, and FIG. 12c is a cross-sectional view taken along 1-1'. In the drawings, a foam member is removed.

Referring to FIG. 12, the vacuum adiabatic body may be used in a door for opening and closing the accommodation space. A hinge may be installed on a first side of the vacuum adiabatic body. The first side may be provided thinner than the second side to prevent interference when the door is opened and closed. The first side may be provided with the additional adiabatic body 90 thinner than the second side. The first side and the second side may be positioned to face each other. The first side may correspond to a side A in FIG. 12a and the second side may correspond to a side B in FIG. 12a. Sides C and D that connect the sides A and B may each have a thickness that gradually changes. Here, the side C may be a third side that is an upper side of the vacuum adiabatic body, and the side D may be a fourth side that is a lower side of the vacuum adiabatic body.

The description of the sides may also be applied in the same way to the first plate 10, the second plate 20, the side plate 15, the additional adiabatic body 90, and the gasket 80. For example, the first and second plates may each be provided in a square shape. For example, the side plate may each be provided in a square shape having four sides.

According to one or more embodiments, the tube 40 may be provided at a portion in which the vacuum space 50 and the additional adiabatic body 90 are in contact with each other. The tube 40 may be provided at a place where the vacuum space 50 and the additional adiabatic body 90 come into contact. A first end of the tube 40 may be positioned in the vacuum space 50, and a second end of the tube 40 may be positioned in the additional adiabatic body 90. The tube 40 may protrude into the additional adiabatic body 90. The other end of the tube 40 may not protrude into the accommodation space to prevent waste of the accommodation space. The foam insulator may be an insulator that solidifies after the foaming solution is injected into a periphery of the vacuum adiabatic body and expanded. The foaming solution may be, for example, polyurethane. The foam insulator may generate a high pressure during an expansion process. The foam insulator may penetrate into a narrow space of the periphery. The tube 40 may not cross an outer boundary of the additional adiabatic body 90. The tube 40 may be embedded in the additional adiabatic body 90 and the vacuum space 50. Examples of the aforementioned tube may include a port such as an exhaust port or a getter port.

Optionally, the height of the tube 40 may be ensured more than twice the diameter of the tube 40. Pinch-off may be performed after exhaust through the tube 40 is completed. Compression deformation may spread during the pinch-off. The spreading deformation may prevent the tube 40 and a coupler of the plate from being deformed and damaged. The tube 40 may be positioned at a corner 211 opposite to an upper hinge among four corners 211 of the vacuum adiabatic body. The tube 40 may be positioned above the vacuum adiabatic body to prevent the tube 40 from being damaged. Examples of the aforementioned tube may include a port such as an exhaust port or a getter port.

Optionally, the foaming solution may be injected downward from the top of the vacuum adiabatic body to use gravity. A lower part of the vacuum adiabatic body may first be filled with the foaming solution. When the foaming solution is filled, the foaming solution may be drawn downward in a direction of gravity. Expansion force of the foaming solution may be greater in the lower part of the vacuum adiabatic body than in the upper part. The foaming solution placed in the lower part of the vacuum adiabatic body may have large expansion force due to a pressure of the foaming solution in the upper part and restrictions of a foaming space due to the foaming solution that is first solidified in the upper part. In order to reduce an effect of the expansion force of the foaming solution on the tube 40, the tube 40 may be provided above the vacuum adiabatic body. In order to minimize an effect of the expansion force of the foaming solution on the tube 40, the tube 40 may be provided in the first portion 101 of the first plate on the upper side of the vacuum adiabatic body. When ductile copper is used as a material of the tube 40, the tube 40 may be directly deformed. Examples of the aforementioned tube may include a port such as an exhaust port or a getter port.

Optionally, in order to reduce an effect of a local difference in the expansion force of the foaming solution on the tube 40, the tube 40 may be provided above the vacuum adiabatic body. The tube 40 may be provided in the first portion 101 of the first plate on the upper side of the vacuum adiabatic body. The tube 40 may be spaced apart from the side plate 15 of the vacuum adiabatic body by a predetermined interval W1. Since the foaming solution solidifies multiple times, the expansion force of the foaming solution may vary locally. For example, the expansion force of the right foaming solution of the tube 40 may be larger than the expansion force of the left foaming solution of the tube 40. In this case, the tube 40 may be d damaged. Damage of the tube 40 may include at least one of deformation of a coupler of the tube 40 and the first plate 10, or expansion damage of a seal of the tube 40. Examples of the aforementioned tube may be ports such as an exhaust port or a getter port.

Optionally, in the vacuum adiabatic body, the thickness of an insulator on a side on which the hinge is placed may be thinner than on the opposite side. The tube 40 may be placed at an opposite side to the hinge in the vacuum adiabatic body to reduce insulation loss. The opposite side to the hinge in the vacuum adiabatic body may refer to an opposite side to the side on which the hinge is installed. Examples of the aforementioned tube may be ports such as an exhaust port or a getter port.

Optionally, the tube 40 may have a long elongated portion protruding into the additional adiabatic body 90. The tube 40 may provide a heat conduction path for heat passing through the tube 40. The tube 40 may provide a place therefor to be positioned by excluding the foaming solution that forms the additional adiabatic body 90. The tube 40 may cause insulation loss of the vacuum adiabatic body. In order to reduce insulation loss due to the tube 40, the tube 40 may be placed at an opposite side to the hinge in the vacuum adiabatic body having the additional adiabatic body 90 having a relatively large thickness. The tube 40 may be provided at the first portion 101 of the first plate on the opposite side to the hinge of the vacuum adiabatic body. Examples of the aforementioned tube may be ports such as an exhaust port or a getter port.

FIG. 13 is a set of a sectional perspective view and a cross-sectional view for explaining a section taken along 2-2' of FIG. 12a, FIG. 13a is a sectional perspective view, and FIG. 13b is a cross-sectional view.

Referring to FIG. 13, the foaming solution may be injected through a foaming solution inlet 470. The foaming solution inlet 470 may not be aligned vertically with the tube 40. The tube 40 may avoid a passage of the foaming solution. The foaming solution injected through the foaming solution inlet may flow down to a lower end of the vacuum adiabatic body without being caught in the tube 40.

In detail, a distance W1 between the tube 40 and the side plate 15 may be smaller than a distance W2 between the tube 40 and an upper cover 112. The upper cover 112 may be placed on an edge of the third side. A lower cover 113 may be placed on the fourth side of the vacuum adiabatic body, which faces the upper cover 112. Examples of the aforementioned tube may be ports such as an exhaust port or a getter port.

FIGS. 14 to 16 are drawings related to a section taken along 3-Y of FIG. 12a, FIG. 14 is a cross-sectional view taken along 3-Y of FIG. 12a, FIG. 15 is an enlarged view of a section of a portion Z of FIG. 14, and FIG. 16 is a sectional perspective view.

Referring to FIGS. 14 to 16, the thickness of the vacuum adiabatic body on the second side may be thicker than the thickness on the first side. The thickness of the additional adiabatic body 90 on the second side may be thicker than the thickness on the first side. Here, the thickness of the vacuum adiabatic body may refer to a height between the first and second plates 10 and 20. The height of the vacuum space 50 on the first side and the second side may be the same.

Optionally, a distance W3 to the tube 40 from the third portion 203 of the second plate at the second side may be smaller than the distance W2 between the tube 40 and the upper cover 112. Accordingly, insulation loss leaking above the tube 40 may be further reduced. An imaginary extension line (the X-axis direction) of the second portion 152 of the side plate may pass through the tube 40 at the second side. Thus, insulation loss leaking toward the second side of the vacuum adiabatic body in the tube 40 may be reduced. The third portion 203 of the second plate may be placed at an edge of at least one of the first side or the second side. Examples of the aforementioned tube may be ports such as an exhaust port or a getter port.

Optionally, a flange 42 may be provided on the first plate 10 in order to couple the tube 40 to the first plate 10. The flange 42 may extend into the vacuum space 50. In this case, the tube 40 may be easily inserted into the flange 42. In this case, even if the first plate 10 is coupled to the second plate 20, the tube 40 may be easily coupled to the flange 42. The flange 42 may extend out of the vacuum space 50. Interference between the flange 42 and components placed inside the vacuum space 50 may be prevented. The flange 42 may overlap the first space in the first portion 101 of the first plate. In this case, insulation loss of the additional adiabatic body 90 may be reduced. Here, overlapping may mean being aligned in a height direction of the vacuum space 50. Examples of the aforementioned tube may be ports such as an exhaust port or a getter port.

An embodiment of the position and properties of the flange 42 will be proposed.

FIGS. 17 and 18 are diagrams showing a flange according to embodiments and propose the cases with different extension directions of flanges and different positions of the flanges according to embodiments.

FIGS. 17a and 17b show the case in which the flange 42 extends out of the vacuum space 50. FIGS. 18a and 18b show the case in which the flange 42 extends into the vacuum space 50. FIGS. 17a and 18a show the case in which the flange 42 overlaps the additional adiabatic body 90 in the first portion 101 of the first plate. FIGS. 17b and 18b show the case in which the flange 42 overlaps the first space in the first portion 101 of the first plate.

According to a first embodiment of FIG. 17a, the accommodation space may be ensured to be wide. The flange 42 may be prevented from interfering with at least one of the support 30 or the heat transfer resistor. According to the present embodiment, at least one of the support 30 or the heat transfer resistor may be installed using various methods. According to the present embodiment, at least one of the support 30 or the heat transfer resistor may be installed in plural.

According to a second embodiment of FIG. 17b, insulation loss of the additional adiabatic body 90 due to the tube 40 may be reduced. The flange 42 may be prevented from interfering with at least one of the support 30 or the heat transfer resistor. According to the present embodiment, at least one of the support 30 or the heat transfer resistor may be installed using various methods. According to the present embodiment, at least one of the support 30 or the heat transfer resistor may be installed in plural. According to the present embodiment, a through hole 170 through which the tub passes may be provided in an internal panel 111. A diameter of the through hole 170 of the internal panel 111 may be larger than an external surface of the flange 42. The flange 42 and the through hole may be spaced apart from each other. When the tube 40 has a circular shape, an outer diameter of the tube 40 may be smaller than an inner diameter of the through hole 170. The through hole of the internal panel 111 may be inclined or rounded to correspond to the shape of the flange 42. Examples of the aforementioned tube may be ports such as an exhaust port or a getter port.

According to a third embodiment of FIG. 18a, the accommodation space may be ensured to be wide. The tube 40 may be conveniently inserted along the flange 42.

According to a fourth embodiment of FIG. 18b, insulation loss of the additional adiabatic body 90 due to the tube 40 may be reduced. The tube 40 may be conveniently inserted along the flange 42. According to the present embodiment, the tube 40 may entirely pass through the first portion 101 of the first plate. According to the present embodiment, the tube 40 may penetrate the internal panel 111. The through hole 170 may be provided through the internal panel 111. Examples of the aforementioned tube may be ports such as an exhaust port or a getter port.

Optionally, the vacuum adiabatic body may include a component connected to the additional adiabatic body 90. Examples related to the component are as follows. The present disclosure may be any one of the following examples, or an example in which two or more examples are combined. The component may include a latch 81. The component may include a first portion and a second portion that is connected to the first portion and is provided. The first portion may include a portion having a lower heat transfer resistance than the second portion. The first portion may be moveably provided. The component 81 may be provided in a central portion of the additional adiabatic body. The component may be accommodated in a groove formed in the additional adiabatic body. The length of the groove in the Y-axis direction may be greater than ½ of the height of the additional adiabatic body in the Y-axis direction.

Optionally, the vacuum adiabatic body may include a second additional adiabatic body that is provided separately from the additional adiabatic body 90. The second additional adiabatic body may have the following examples. The present disclosure may be any one of the following examples or a combination of two or more examples. The second additional adiabatic body may have a smaller height than the additional adiabatic body in the Y-axis direction. The second additional adiabatic body may have a smaller volume than the additional adiabatic body. The second additional adiabatic body may include a portion to which a component separated from the component is connected. The separate component may include a hinge. The separate component may be provided not to overlap a portion of the side plate 15 in a height direction of the vacuum space. The portion of the side plate may include a portion that extends in the height direction of the vacuum space. The portion of the side plate may be positioned within the additional adiabatic body. The portion of the side plate may be spaced apart from the component by a predetermined distance in a longitudinal direction of the vacuum space. The predetermined distance may be greater than the height of the vacuum space. The portion of the side plate may be provided to overlap the component in the longitudinal direction of the vacuum space. The component may be provided not to overlap a portion of the support 30 in the height direction of the vacuum space. The portion of the support 30 may include the bar. The portion of the support 30 may include the bar 31 and an additional bar that is adjacent to the bar and is spaced apart from the bar by a predetermined distance. The portion of the support 30 may be spaced apart from the component by a predetermined distance in the longitudinal direction of the vacuum space. The predetermined distance may be greater than the height of the vacuum space. The portion of the support 30 may be provided to overlap the component in the longitudinal direction of the vacuum space.

FIG. 19 is a cross-sectional view of a periphery of a vacuum adiabatic body.

Referring to FIG. 19, a region in which the latch 81 is placed may be defined by two imaginary lines L1 and L2 in the height direction of the vacuum space 50. An extension line of a second portion 102 of the first plate 10 may be indicated by one imaginary line L3. The first plate 10 may include two layers, i.e. first inner case 10a and second inner case 10b.

An edge of a first straight portion 221 may be placed in a gap G1 (first gap) between the imaginary line L2 close to the vacuum space 50 and the imaginary line L3 of the second portion 102 of the first plate in the two imaginary lines indicating an installation region of the latch 81 of the three imaginary lines. The second portion 152 of the side plate may include the first straight portion 221. Among the two imaginary lines indicating the installation region of the latch 81, the imaginary line L2 close to the vacuum space 50 and an edge of the second portion 152 of the side plate may be spaced apart from each other. The latch 81 and the edge of the second portion 152 of the side plate may be spaced apart from each other.

A foaming solution may flow in a gap G2 (second gap) between the latch 81 and the edge of the second portion 152 of the side plate. The foaming solution may pass through the gap G2 in order to provide the additional insulator. The foaming solution may be injected at high pressure to fill an entire region of a periphery of the vacuum adiabatic body. The foaming solution may flow without clogging through the gap G2 between the latch 81 and the edge of the second portion 152 of the side plate. The foaming solution may smoothly flow into the gap G1 (region A) between the latch 81 and the second portion 102 of the first plate. When the second portion 152 of the side plate extends to the two imaginary lines L1 and L2 indicating the installation region of the latch 81, it may be difficult to allow the foaming solution to flow due to a narrow gap between the latch 81 and the second portion 152 of the side plate. In this case, the foaming solution may not flow in the gap G1 (region A) between the latch 81 and the second portion 102 of the first plate and thus may not be filled. The foaming solution may not be filled to cause at least one of severe insulation loss or a reduction in strength of the vacuum adiabatic body.

At least a portion of the vacuum space 50 may be placed in the gap between the imaginary line L2 close to the vacuum space 50 and the imaginary line L3 of the second portion 102 of the first plate among the two imaginary lines indicating the installation region of the latch 81. The support 30 may be placed in the vacuum space 50. A bar that provides the support 30 may extend in a height direction of the vacuum space 50. At least one of the bar may be disposed in parallel or adjacent to the imaginary line L3 of the second portion 102 of the first plate. The bar disposed in parallel or adjacent to the imaginary line L3 of the second portion 102 of the first plate may be a bar placed at the outermost side in a longitudinal direction of the vacuum space 50. The imaginary line L3 of the second portion 102 of the first plate may be a portion to which impact is applied while the vacuum adiabatic body is moved. For example, impact when a door is opened and closed may be transferred to the vacuum adiabatic body along the second portion 102 of the first plate. Impact applied to the vacuum adiabatic body may be transferred to the support 30 through the first plate 10. The impact may be transferred to the bar. The impact transferred to the bar may cause two types of stress. The first stress may be a compressive stress applied in the longitudinal direction of the bar, and the second stress may be a shear stress applied in the thickness direction of the bar. The shear stress may apply a greater effect to the bar than the compressive stress. As the bar is adjacent to the imaginary line L3 of the second portion 102 of the first plate, the compressive stress may be dominant. When the bar is positioned in parallel to the imaginary line L3 of the second portion 102 of the first plate, only the compressive stress may be applied to the bar. As the second portion 102 of the first plate is farther from the imaginary line L3, the shear stress may be dominant.

According to the present embodiment, the support may be prevented from being damaged. According to the present embodiment, the bar may be prevented from being damaged. According to the present embodiment, the vacuum adiabatic body may be prevented from being damaged, fatigue of the member may be suppressed, and the durability of the vacuum adiabatic body may be increased.

FIG. 20 is a diagram showing comparison between a cross-sectional view at the second side of the vacuum adiabatic body and a cross-sectional view at the first side of the vacuum adiabatic body.

Referring to FIG. 20, a portion at the second side of the vacuum adiabatic body and a portion at the first side of the vacuum adiabatic body may be different from each other. The additional adiabatic body may differ at the first and second sides of the vacuum adiabatic body. A space in which the additional adiabatic body is placed may be defined as an internal portion of the first plate 10, the second plate 20, and the side plate 15. The additional adiabatic body 90 may use a foam insulator or various insulating materials such as pre-molded resin.

An insulating area (XY plane) of the additional adiabatic body 90 at the second side may be larger than at the first side. An insulating thickness of the height direction (the Y-axis direction) of the vacuum space 50 of the additional adiabatic body 90 at the second side may be larger than at the first side. Accordingly, more additional adiabatic bodies 90 may insulate the portion at the second side, and a component such as the latch 81 may reinforce insulation performance of the portion at the second side. An insulating thickness of the additional adiabatic body 90 at the first side in the longitudinal direction (the X-axis direction) of the vacuum space 50 may be larger than at the second side. Thus, insulation loss leaking to an edge at the first side may be reduced.

An insulation thickness change rate of the additional adiabatic body 90 at the first side in the height direction (the Y-axis direction) of the vacuum space 50 may be larger than at the second side. Thus, it may be possible to minimize interference of components according to opening and closing of a door on a side on which a hinge is placed while reducing insulation loss. Accordingly, an inclination angle A of the second portion 202 of the second plate may be relatively large at the first side. The second portion 202 of the second plate may interfere with an external object, but the inclination angle A of the second portion 202 of the second plate may be large, thereby preventing the interference.

The additional adiabatic body 90 may use a foam insulator. The foam insulator may be formed by injecting and then solidifying a foaming solution. The foaming solution may be a fluid and may be affected by a hydraulic diameter of a space into which the foaming solution is injected. The hydraulic diameter may be proportional to the insulating area and inversely proportional to the length of the curve surrounding the insulating area. The hydraulic diameter at the second side may be larger than at the first side. The foaming solution may smoothly flow at the second side than at the first side. The foaming solution may be filled larger at the second side than at the first side. When a large amount of the foaming solution is injected, a greater foaming pressure may be applied.

The hydraulic diameter at the second side may be larger than at the first side, and thus the foaming solution at the first side may not smoothly flow. In order to improve the fluidity of the foaming solution, the second portion 152 of the side plate at the first side may not extend to a component. In order to improve the fluidity of the foaming solution, the second portion 152 of the side plate at the first side may be maintained to be spaced apart from the component at a predetermined interval in the longitudinal direction (the X-axis direction) of the vacuum space 50. In order to improve the fluidity of the foaming solution, the second portion 152 of the side plate at the first side may not overlap the component in the height direction (the Y-axis direction) of the vacuum space 50. Here, the component may include a hinge.

The fluidity of the foaming solution at the second side may not be poor, but the position of each member may be changed or a member may be deformed due to a high foaming pressure. The second portion 152 of the second plate at the second side may extend over a component in the longitudinal direction (the X-axis direction) of the vacuum space 50. Thus, the second portion 152 of the side plate and the component may interact to maintain a positional relationship between members according to a design. The second portion 152 of the side plate at the second side may overlap the component in the height direction (the Y-axis direction) of the vacuum space. Accordingly, the second portion 152 of the side plate and the component may interact to maintain a positional relationship between members according to a design. Here, the component may include the latch 81. In addition, various components may be in contact with each other, may be supported by each other, or may be fixed to each other. Movable members such as the latch 81 exposed to external shocks may maintain original design positions thereof due to the interconnection structure.

The positional relationship between the second portion 152 of the side plate and the component may also be applied in the same way to the support 30, the heat transfer resistor 32, and a vacuum insulation extension. Examples of the heat transfer resistor may include a radiation resistance sheet.

A hinge including a hinge shaft 21 may be placed at the first side. The latch 81 may be placed at the second side. At least a portion of the latch may be accommodated in a component accommodation space 830. The component accommodation space 830 may accommodate various components such as the latch. The additional adiabatic body 90 may not be placed in the component accommodation space 830. The additional adiabatic body 90 may not interfere with the action of the component.

The component accommodation space 830 may be protected by a component case 810 that is opened upward in the height direction (the Y-axis direction) of the vacuum space. The component case 810 may provide a lower wall of the component accommodation space 830. The component case 810 may have a lower part 811 adjacent to the second portion 152 of the side plate. The component case 810 may have an internal part 812 adjacent to a central part of the vacuum space. The component case 810 may have an outer part 813 adjacent to a periphery of the vacuum space. The component case 810 may be provided as a single body. The second portion 102 of the first plate may have a gasket accommodation part 103 on which the gasket 80 is placed. The second portion 102 of the first plate may have a plurality of bent sections. The second portion 102 of the first plate may have fourth and fifth portions 107 and 105 of the first plate, which extend in the height direction of the vacuum space. The fourth portion 107 of the first plate may be aligned with the internal part 812. The fourth portion 107 of the first plate may be more adjacent to the component accommodation space 830 than the internal part 812. The second portion 102 of the first plate may have a step difference 108. An upper end of the internal part 812 may be in contact with a lower end of the step difference 108. A foaming solution may not flow between the internal part 812 and the fourth portion 107 of the first plate. The fifth portion 105 of the first plate may be aligned with the outer part 813. The fifth portion 105 of the first plate may be more adjacent to the component accommodation space 830 than the outer part 813. The fifth portion 105 of the first plate may include a stair portion 1051. An upper end of the outer part 813 may be in contact with a lower end of the stair portion 1051. A foaming solution may not flow between the outer part 813 and the fifth portion 105 of the first plate. The second portion 102 of the first plate may include a sixth portion 106 of the first plate, which is in contact with the second plate 20. The second plate 20 and the sixth portion 106 of the first plate may be fixedly coupled to each other.

An upper wall of the component accommodation space 830 may be provided by a component cover 820. The component cover 820 may have a step difference. The component cover 820 may include a plate corresponding surface 822 having the same height as that of the sixth portion 106 of the first plate. The component cover 820 may include a through hole 823. The through hole 823 may be provided in the plate corresponding surface 822. The component cover 820 may include a gasket accommodation portion 821 on which the gasket is accommodated. The gasket accommodation portion 821 and the plate corresponding surface 822 may have different heights in the height direction of the vacuum space. At least a portion of a latch, for example, a flange may protrude out of the through hole 823. The flange may be caught by the body.

After the component case 810 and the first plate 10 are coupled to each other, the latch 81 may be placed. After the latch 81 is placed, the component cover 820 may be coupled thereto. After coupling the component cover 820, the gasket 80 may be coupled.

Referring to FIG. 21, the internal panel 111, an external panel 112, the upper cover 112, the lower cover 113, and the latch 81 may be further installed. A space into which a foaming solution is injected may be formed by the internal panel 111, the external panel 112, the upper cover 112, the lower cover 113, the vacuum adiabatic body, and the like. The foaming solution may be injected to form the additional adiabatic body 90.

The latch 81 may have a portion that extends a long way in the depth direction (the Z-axis direction) of the vacuum space. The extending portion may extend a long way vertically inside the component accommodation space 830. A lower end of the latch may reach a lower end of the vacuum adiabatic body. An upper end of the latch may reach a middle part of the vacuum adiabatic body. An operation knob may be provided on the lower end of the latch. The flange may be provided on the upper end of the latch. The operation knob may be operated by a user. The flange may be related by operating the operation knob by the user. A door may be opened by operating the operation knob.

FIG. 22 is a cross-sectional view of a vacuum adiabatic body.

Referring to FIG. 22, the second portion 152 of the side plate may be placed at a central side of the vacuum space 50 on the imaginary line L1 formed when the vacuum space 50 extends in a height direction from the second portion 102. The second portion 152 of the side plate may include the first straight portion 221. When the vacuum adiabatic body is divided into a central side and a periphery by the imaginary line L1 of the second portion 102 of the first plate, the second portion 152 of the side plate may be placed on the central portion of the vacuum adiabatic body. The second portion 152 of the side plate may be aligned with an inside space in a height direction of the vacuum space 50. The second portion 152 of the side plate may be placed inside a portion from which the first portion 101 of the first plate and the second portion 202 of the second plate are branched. The imaginary line L1 of the second portion 102 of the first plate and an edge of the second portion 152 of the side plate may be aligned with each other. The second portion 152 of the side plate may be spaced apart from the additional adiabatic body 90 inside the additional adiabatic body 90. The second portion 152 of the side plate may be adhered to the internal panel 111. The second portion 152 of the side plate and the internal panel 111 may be pressed together. A seal for coupling the second plate 20 and the first plate 10 may be placed on the second portion 152 of the side plate.

The second portion 152 of the side plate may include a bent portion of the first plate 10, which is formed during sealing. The bent portion may be formed when the vacuum adiabatic body is handled. The bent portion may be formed by deformation of the thin first plate 10 while the vacuum adiabatic body is handled. The bent portion may be unfolded by adhesion of the internal panel 111 and the second portion 152 of the side plate. The second portion 152 of the side may be restored to an original design shape by the adhesion.

The first plate 10 and the second plate 20 may be in contact with each other more firmly by pressing the internal panel 111. There is no gap between the first plate and the second plate at an edge of the first straight portion 221. Since there is no gap between the first plate and the second plate, a foaming solution may not flow between the first plate and the second plate. The seal may be prevented from being damaged by a foaming operation of the foaming solution.

The foaming solution may be a member at high pressure. In a high pressure state of the foaming solution, pressure may be applied to the bar through the first plate 10. The bar may be damaged by the pressure. In the vacuum adiabatic body according to an embodiment, the foaming solution may not flow on an outer surface of the first plate 10. The vacuum adiabatic bod may prevent the bar from being damaged due to the foaming solution at high pressure.

The vacuum space may not be placed at an edge of the first portion 101 of the first plate. In an edge of the first portion 101 of the first plate, a thin additional insulator may be placed, and thus a portion that is insufficiently insulated may be formed. The portion that is insufficiently insulated may be formed at an edge connecting the first portion 101 of the first plate and the second portion 102 of the first plate. To reinforce insufficient insulation performance of the edge, an inner high reinforcement insulator 910 may be placed at a connector between the first portion 101 of the first plate and the second portion 102 of the first plate. The inner high reinforcement insulator 910 may be placed in an accommodation space that is a space at low temperature. The inner high reinforcement insulator 910 may be placed at a connector between the first portion 101 of the first plate and the second portion 102 of the first plate. The inner high reinforcement insulator 910 may be placed at the first portion 101 of first plate the first portion 101 and an internal surface of the second portion 102 of the first plate.

FIG. 23 is a cross-sectional view of a periphery of a vacuum adiabatic body according to another embodiment.

Referring to FIG. 23, in order to reinforce insulation performance of the edge, a separate inclination portion 911 may be provided in the internal panel 111. The inclination portion 911 may connect the first portion 101 of the first plate and the second portion 102 of the first plate. The inclination portion 911 may configure one body with the internal panel 111. The inclination portion 911 and the internal panel 111 may be simultaneously ejected. The other parts may be the same as in the above embodiment.

INDUSTRIAL APPLICABILITY

The present disclosure may provide a vacuum adiabatic body applicable to a real life.

The invention claimed is:

1. An adiabatic body comprising:
a first plate, the first plate including a first inner case and a second inner case;
a second plate spaced apart from the first plate to form a vacuum space between the second plate and the first plate in a first direction;
a component including a first portion having a movable portion and a second portion that is connected to the first portion; and a side plate configured to provide a side of the vacuum space, wherein the side plate includes a first side portion to form a side of the vacuum space, and a second side portion that extends from the first side portion in a longitudinal direction of the vacuum space, wherein the second inner case includes a first portion to cover part of the first inner case and a second portion that extends in a direction away from the first portion of the second inner case, wherein among two imaginary lines extending in the first direction from an installation region of the component, an edge of the second side portion of the side plate is disposed in a first gap between a first imaginary line (L2) close to the vacuum space and a second imaginary line (L3) extending in the first direction from the second portion of the second inner case, wherein a second gap is provided between the component and the edge of the second side portion of the side plate.

2. The adiabatic body of claim 1, including an additional adiabatic body placed in a periphery of the adiabatic body, wherein the component is accommodated in a groove formed in the additional adiabatic body.

3. The adiabatic body of claim 2, wherein a length of the groove in the first direction is greater than ½ of a height of the additional adiabatic body in the first direction.

4. The adiabatic body of claim 1, wherein at least a portion of the vacuum space is disposed in an interval between the first imaginary line (L2) and the second imaginary line (L3).

5. The adiabatic body of claim 1, wherein the component includes a door latch.

6. The adiabatic body of claim 1, wherein the component is spaced apart from the edge of the second side portion of the side plate.

7. The adiabatic body of claim 1, wherein the component has a first length in the first direction, a second length in a second direction, and a third length in a third direction, wherein the third length of the component is longer than at least one of the first length in the first direction and the second length in the second direction.

8. The adiabatic body of claim 1, comprising:
a support for maintaining the vacuum space,
wherein the support includes a plurality of bars spaced apart from each other.

9. The adiabatic body of claim 8, wherein at least one of the plurality of bars is disposed in parallel to or next to the second imaginary line (L3), the second imaginary line being a portion to which impact is applied while the adiabatic body is moved.

10. The adiabatic body of claim 8, wherein at least one of the plurality of bars is disposed in parallel to the second imaginary line (L3), and the first inner case and the second inner case directly contact such that an impact applied to the adiabatic body is transferred to the at least one of the plurality of bars through the first plate.

11. The adiabatic body of claim 1, wherein the second side portion of the side plate is disposed at a central side of the vacuum space on a third imaginary line (L1) extending in the first direction from the first plate.

12. The adiabatic body of claim 1,
including a first additional adiabatic body placed in a periphery of the adiabatic body, and a second additional adiabatic body that is provided separately from the first additional adiabatic body.

13. The adiabatic body of claim 12, wherein the second additional adiabatic body includes a portion to which another component separated from the component is connected.

14. The adiabatic body of claim 12, wherein the second additional adiabatic body has a smaller volume than the first additional adiabatic body.

15. The adiabatic body of claim 12, wherein the second additional adiabatic body includes a gasket, the gasket provided to overlap at least one of the first side portion and the second side portion of the side plate in the first direction.

16. The adiabatic body of claim 1, wherein an additional insulator is provided by a foaming solution passing through the second gap.

17. The adiabatic body of claim 1, wherein a region of a periphery of the adiabatic body is filled with a foaming solution injected at high pressure, and the foaming solution flows without clogging through the second gap.

18. The adiabatic body of claim 1, wherein the second inner case is disposed outside the vacuum space and includes an inclination portion that is inclined to reinforce insulation.

19. The adiabatic body of claim 1, comprising:
a component coupler connected to at least one of the first or second plate, and is configured to couple to the component.

20. The adiabatic body of claim 1,
wherein the side plate includes a first curved portion including a portion connected to the first plate and the other portion connected to an additional straight portion or an additional curved portion and/or a second curved portion including a portion connected to the second plate, and the other portion connected to an additional straight portion or an additional curved portion.

* * * * *